US006530833B2

(12) United States Patent  
Imel et al.

(10) Patent No.: US 6,530,833 B2
(45) Date of Patent: *Mar. 11, 2003

(54) TRANSVERSELY ADJUSTABLE CONCAVE ASSEMBLY FOR A ROTARY COMBINE

(75) Inventors: Clint J. Imel, East Moline, IL (US); Robert A. Matousek, Milan, IL (US); Glenn E. Pope, Viola, IL (US); Jon E. Ricketts, Viola, IL (US)

(73) Assignee: Case Corporation, Racine, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/176,136

(22) Filed: Jun. 19, 2002

(65) Prior Publication Data

US 2002/0160822 A1 Oct. 31, 2002

Related U.S. Application Data

(62) Division of application No. 09/963,617, filed on Sep. 27, 2001, and a division of application No. 09/503,512, filed on Feb. 14, 2000, now Pat. No. 6,358,142.

(51) Int. Cl.[7] .................................................. A01F 12/28
(52) U.S. Cl. ......................... 460/109; 460/107; 460/72; 460/46; 460/62
(58) Field of Search ............................... 460/46, 59, 66, 460/69, 79, 80, 107, 108, 109, 119, 110, 141, 62, 71, 72

(56) References Cited

U.S. PATENT DOCUMENTS

| 3,470,881 | A | * | 10/1969 | Knapp et al. | 460/109 |
| 4,330,000 | A | * | 5/1982 | Peiler | 460/109 |
| 4,607,480 | A | * | 8/1986 | Yarmashev et al. | 460/66 |
| 4,774,968 | A | * | 10/1988 | Spanlang | 460/109 |
| 5,489,239 | A | * | 2/1996 | Matousek et al. | 460/109 |
| 5,743,795 | A | * | 4/1998 | Kersting | 460/109 |

FOREIGN PATENT DOCUMENTS

DE          4000909 A1  *  8/1990

* cited by examiner

Primary Examiner—Robert E. Pezzuto
Assistant Examiner—Nathan Mammen
(74) Attorney, Agent, or Firm—John William Stader; Larry W. Miller

(57) ABSTRACT

A rotary combine includes a rotor having a longitudinal axis of rotation and a concave removably mounted adjacent the rotor. The concave assembly includes a longitudinally extending frame having first and second sides spaced circumferentially around the rotor. Each of the first and second sides is transversely moveable relative to the axis of rotation of the rotor. A method for adjusting the position of the concave assembly is provided and includes moving at least one of the first and second sides of the frame in a direction transverse to the axis of rotation.

1 Claim, 22 Drawing Sheets

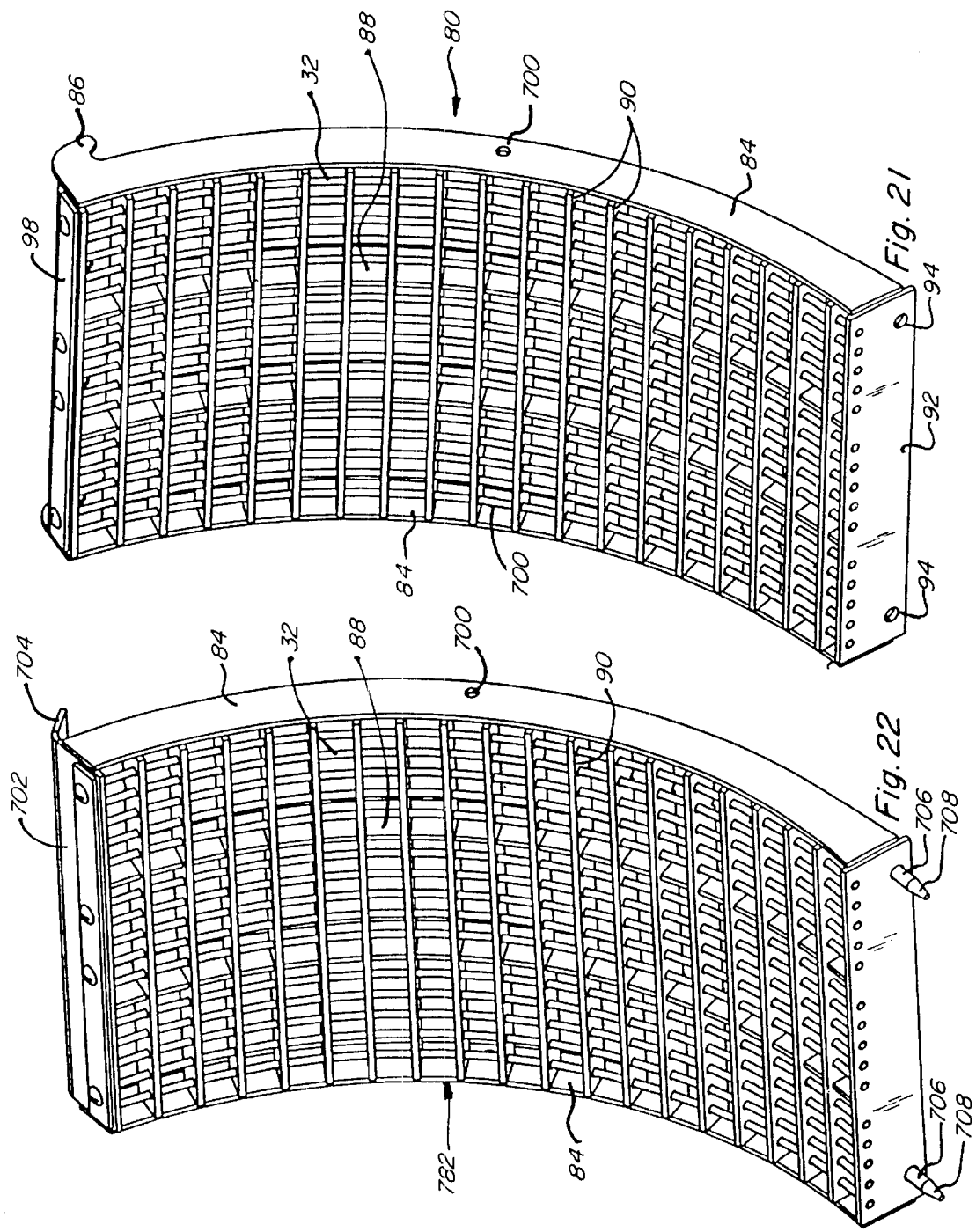

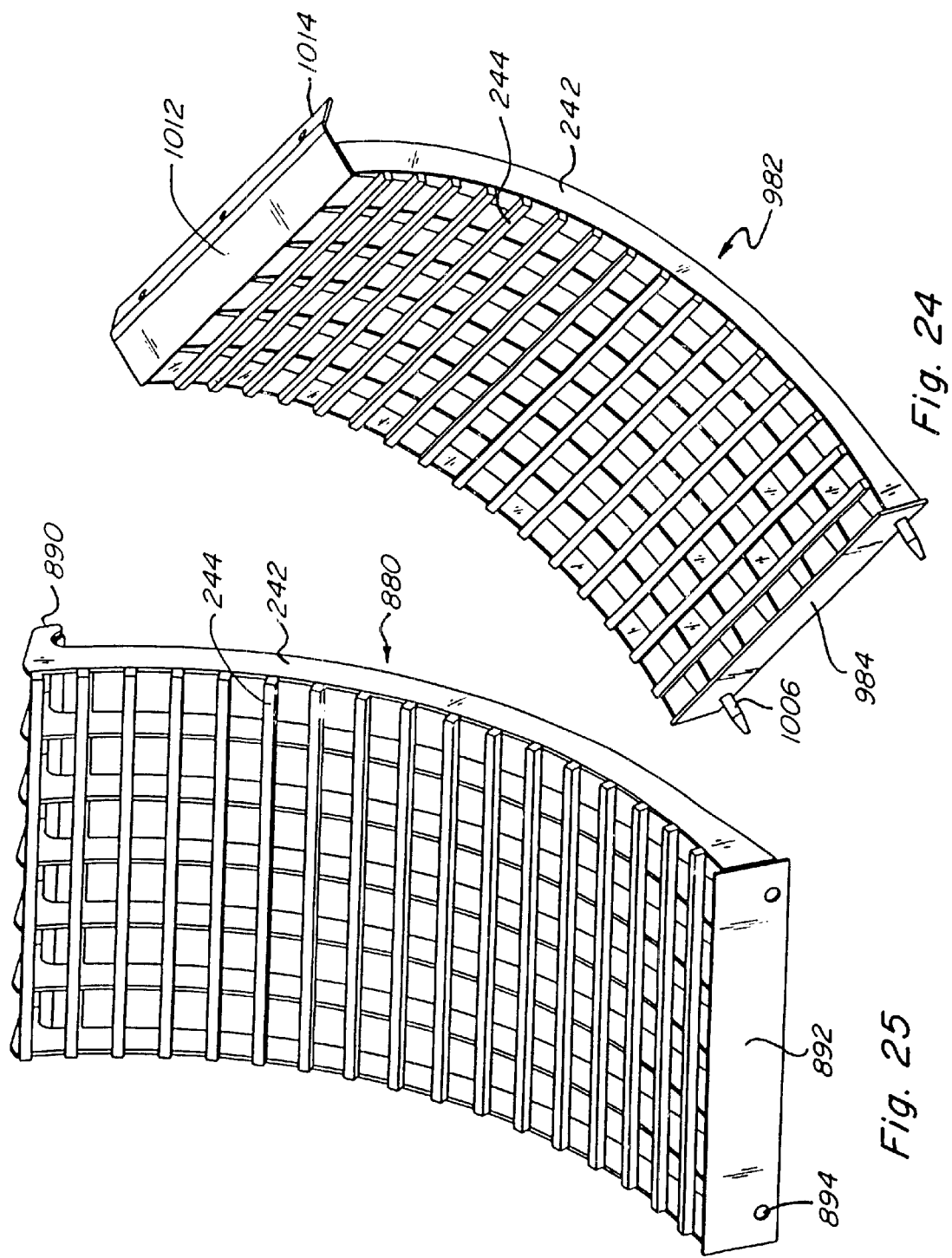

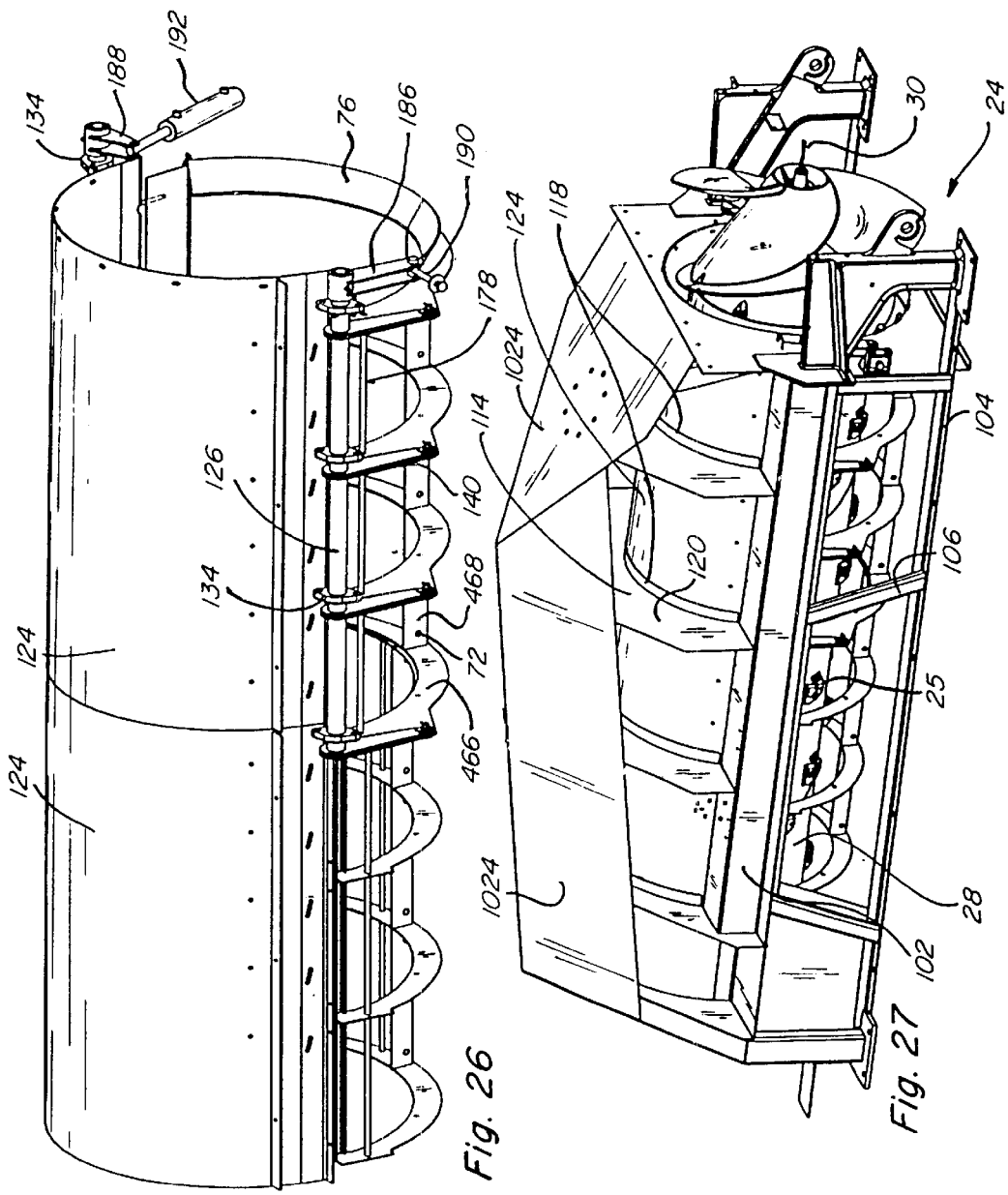

TRANSVERSELY ADJUSTABLE CONCAVE ASSEMBLY FOR A ROTARY COMBINE

This is a divisional of application Ser. No. 09/503,512 filed on Feb. 14, 2000, now U.S. Pat. No. 6,358,142, and a divisional of co-pending application Ser. No. 09/963,617, filed Sep. 27, 2001.

BACKGROUND OF THE INVENTION

The present invention relates generally to a concave assembly for a rotary combine, and in particular, to an adjustable concave assembly having removable concaves.

Agricultural combines are well know in the art for harvesting and threshing a number of various agricultural crops, including for example corn, wheat, soybeans, etc. Typically, agricultural combines include a harvesting apparatus, an infeed mechanism and a separating apparatus. In operation, the harvesting apparatus reaps the crop, which is planted in the ground, with the infeed mechanism thereafter feeding the crop to the separating apparatus.

Typically, the separating apparatus in a rotary combine includes a rotor, which can extend axially or transversely within the body of the combine, and which is surrounded at least in part by a perforated cage having a plurality of apertures. As shown for example in U.S. Pat. No. 5,489,239, issued Feb. 6, 1996 to Case Corporation, the same assignee as for the present application, the cage can include a series of concaves arranged in a side-by-side configuration, with each concave extending partially circumferentially around the rotor. Usually, it is desirable to provide for an adjustment of the concaves, wherein the spacing between the concaves and the rotor can be altered to provide for the threshing of different crops in different conditions. For example, it is known to pivotally support one end of the concave about an axis, with the other end thereof being adjustable for movement of the concave toward and away from the rotor as it pivots about the one end. As such, concaves typically are easily and readily adjustable only along one end thereof, and are adjustable only with relative difficulty at the other end, which is typically pivotally attached. Moreover, the adjustment of the concaves can be time consuming, which can lead to compromises in reaching optimum settings.

In addition to adjusting the position of the concaves, it also can be desirable to have the ability to remove and/or replace one or more concaves positioned along the length of the rotor. For example, the user may desire to select the size and shape of the apertures defined by the concave such that the concave is suitable for harvesting a different crop having a smaller or larger grain. It may also be desirable to replace a concave if, for example, one or more of the concaves becomes damaged by the introduction of a foreign object, such as a rock, between the rotor and the concave.

Concaves arranged in a side-by-side configuration can be removed sideways from the combine in a direction transverse to the longitudinal extent of the rotor, as illustrated for example in U.S. Pat. No. 3,871,383. Often, however, concaves include a heavy integral frame designed to withstand the substantial forces imparted by the threshing operation. As such, concaves typically are of a robust construction, which can thereby lead to the concaves being relatively heavy and difficult to handle. Moreover, each concave typically spans the entire circumferential span of the threshing area defined around the rotor, which typically is on the order of about 120 to 130 degrees measured around the axis of the rotor. The relatively large size and weight of the concaves associated with this span further contribute to difficulties with the handling and installation thereof.

SUMMARY OF THE INVENTION

Briefly stated, one aspect of the invention is directed to an improved rotary combine having a rotor with a longitudinal axis of rotation and a support structure disposed adjacent the rotor. A longitudinally extending frame has first and second sides spaced circumferentially around the rotor. Each of the first and second sides is moveably mounted to the support structure such that each of the sides is moveable relative to the support structure in a transverse direction. A concave insert is removably mounted to the frame, with the concave insert being removable therefrom in an outward, transverse direction.

In a preferred embodiment, the first and second sides of the frame are pivotally connected to a first and second shaft respectively. Preferably, a first and second arm extend radially from the first and second shafts respectively. A link has a first-end pivotally connected to the second arm and a second end pivotally connected to the second side of the frame. The first arm is pivotally connected to the first side of the frame.

In another aspect of the invention, a first and second concave each have a first and second end spaced circumferentially around the rotor respectively. The first end of each of the first and second concaves are releasably mounted to a frame. In a preferred embodiment, at least one of the first and second concaves is pivotally mounted about a pivot axis, which axis is substantially parallel to the longitudinal axis of rotation of the rotor and is spaced circumferentially around the rotor. In an alternative embodiment, both of the first and second concaves are pivotally mounted about a first and second pivot axes respectively, with both axes being substantially parallel to the longitudinal axis of the rotor and spaced circumferentially around the rotor. The first and second concaves are outwardly pivotable about the first and second pivot axis respectively in opposite directions relative to each other.

In another aspect of the invention, the rotary combine includes a longitudinally extending frame having at least a first and second rib member extending transversely between the first and second side of the frame. The first and second rib members are longitudinally spaced apart and define an opening therebetween. Each of the first and second concave inserts is dimensioned to be removed from the first and second sides of the frame through the opening in a transverse direction.

In another aspect of the invention, a concave is releasably and pivotally mounted about a pivot axis substantially parallel to the axis of rotation of the rotor. A locking member is pivotable between an engaged position, wherein the locking member engages a first end of the concave, and a disengaged position, wherein the locking member is disengaged from the first end of the concave. In a preferred embodiment, the first end of the concave includes a pivot shaft and the locking member comprises a hook member that engages the pivot shaft.

In yet another aspect of the invention, the support structure includes an upper portion having two intersecting, inclined surfaces. In a preferred embodiment, the upper portion defines and/or supports a floor of a grain bin thereabove.

In yet another aspect, a method is provided for replacing a concave in a rotary combine having at least a first and second concave each with a first and second end spaced circumferentially around the rotor respectively. The first ends of each of the first and second concaves are releasably mounted to the frame. In a preferred embodiment, at least the first end of the first concave is pivotally mounted about a pivot axis. In an alternative embodiment, the first end of each of the first and second concave are pivotally mounted about parallel first and second pivot axes respectively. The method includes pivoting the first concave in an outwardly, transverse direction about a first pivot axis and disengaging a first end thereof from the support structure. The method further includes engaging a first end of a replacement concave with the support structure and pivoting the replacement concave about the first pivot axis in an inwardly, transverse direction.

In yet another aspect, a method for replacing a concave insert in a rotary combine includes removing the concave insert through an opening defined between a first and second rib member of a frame. A replacement concave insert is thereafter inserted through the same opening.

The present invention provides significant advantages over other rotary combines. In particular, a concave assembly having a first and second side both moveable in a transverse direction, and preferably including movement in a transverse lateral direction, allows for a quick and easy adjustment of the concave relative to the rotor, and also provides the user with more flexibility in controlling the space between the concave assembly and the rotor. For example, as the concave assembly is moved in a transverse lateral direction, the concave assembly can also be rotated independently thereof so as to maintain a desired spacing between the rotor and concave assembly along the entire circumferential span of the concave assembly. In this way the user can better control the pinching that can occur between the concave and the rotor.

In addition, by providing a frame that is mounted to a support structure, the concave inserts, which are removably mounted thereto, can be made with smaller and lighter structure, since the concave insert is not alone required to carry the loads applied by the threshing operation. Rather, that function primarily is left to the underlying frame. Accordingly, the concave inserts can be made lighter and therefore can be more easily handled and manipulated by the user. Similarly, by providing at least a first and second concave insert defining the circumferential span of the concave assembly, both the size and weight of the concave inserts can be greatly reduced, so as to again facilitate the removal and replacement thereof. Moreover, as a result, the overall combined circumferential span of each of the at least first and second concave inserts can be increased. For example, the combined threshing span can be approximately 180 degrees, with each of a first and second concave insert each having a span of approximately 90 degrees. In this way, the overall threshing area of the concave assembly can be increased without increasing the size and weight of the concave inserts, and the attendant difficulty in the handling thereof. Indeed, the size and weight of each concave insert can actually be reduced, while at the same time increasing the overall circumferential span of the concave assembly.

In addition, the frame, with its openings, allows for the easy removal and installation of concaves in a direction transverse to the axis of rotation of the rotor, for example, from the side of a combine having an axially extending rotor. As such, the user can easily install one or more concaves as needed, without disturbing the position of the remaining concaves. For example, a first and second concave can be releasably attached at circumferentially spaced ends, so as to thereby allow the user to remove one or more of the concaves in an outwardly transverse direction without disturbing the other of the concaves. Furthermore, the pivotable locking member allows the user to quickly and securely engage and disengage at least one end of the concave.

In addition, the overall construction of the assembly and the interchangeability of the concaves, which can be made smaller and at less cost, allows the user to replace the various concaves in a more cost-effective manner than is presently realized in the industry.

The support structure with its inclined upper surfaces also provides significant advantages. In particular, the construction of the support structure provides increased structural strength and stability, while at the same time providing a inclined floor for the grain bin, which can facilitate the emptying thereof.

The present invention, together with further objects and advantages, will be best understood by reference to the following detailed description taken in conjunction with the accompanying drawings.

BRIEF DESCRIPTION OF THE DRAWINGS

FIG. 21 is a perspective view of an alternative embodiment of a right side concave insert.

FIG. 22 is a perspective view of an alternative embodiment of a left side concave insert.

FIG. 24 is a perspective view of an alternative embodiment of a left side grate insert.

FIG. 25 is a perspective view of an alternative embodiment of a right side grate insert.

FIG. 26 is a right side perspective view of the concave assembly with covers disposed thereabove.

FIG. 27 is a right side perspective view of the support structure, rotor, frame and covers.

DETAILED DESCRIPTION OF THE PRESENTLY PREFERRED EMBODIMENTS

Figure 1:
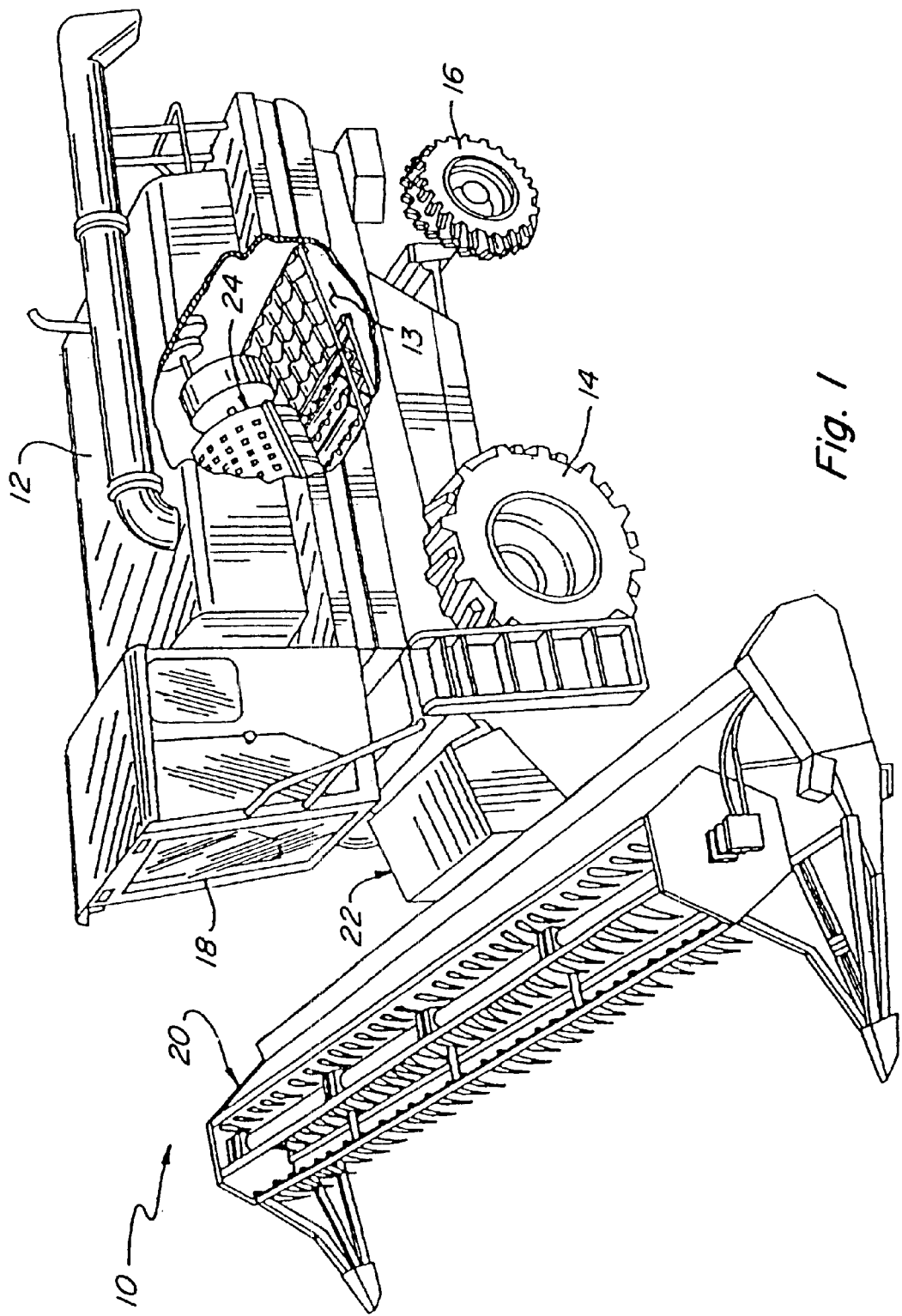
FIG. 1 is a perspective view, partially broken away, of an agricultural rotary combine.

Referring to the drawings, FIG. 1 shows a conventional self-propelled rotary combine 10 that includes a body or housing 12 defining an internal open area or space 13. The body, which can include a supporting frame, is supported on front drive wheels 14 and steerable rear wheels 16. The combine is powered by an engine (not shown) and controlled from an operator's station 18. A crop harvesting apparatus 20, otherwise referred to as a header, and an infeed mechanism 22 are attached at a forward end of the combine. The infeed mechanism 22 feeds crop materials to a rotor assembly 24 enclosed within the housing. One example of a rotary combine configured with a rotary assembly is disclosed in U.S. Pat. No. 5,489,239, which issued Feb. 6, 1996 to Case Corporation, the same assignee as the present application, and which is hereby incorporated herein by reference.

As best shown in FIGS. 2, 18, 19 and 26, the rotor assembly 24 is preferably configured as a single axial unit that threshes and separates crop materials presented thereto into grain and other materials. However, it should be understood that the rotary combine could be configured with more than one rotary assembly, for example, with two units arranged in a parallel configuration. As shown, the rotor assembly 24 is mounted in the internal area 13 defined by the housing 12 and includes a rotor 28 with a longitudinal extent rotatably mounted to the housing about a longitudinal axis of rotation 30, which extends axially along the length of the combine. It should be understood that the term longitudinal means of or relating to length or the lengthwise dimension. It should also be understood that the rotor, with its longitudinal extent could be mounted within the housing so as to extend laterally from side-to-side within the combine. It should be understood that the terms "left side," "right side," "left," "right," "front," "rear," "upper," "lower," "top," and "bottom," and their derivatives, as used herein are intended to indicate directions relative to the views presented in the Figures, and in particular, from a perspective when viewing the rotary combine from the operator's position in the rotary combine.

Between the upstream, or front end, and the downstream, or rear end, of the rotor assembly 24, the crop materials is threshed as it spirals around the rotor 28 against a threshing cage disposed partially, circumferentially around the rotor. The rotor can be dimensioned with a broad range of diameters, depending on the desired size and performance characteristics of the combine. For example, suitable rotors may have a diameter in the range of 15 inches to 30 inches, although it should be understood that other diameters, larger and smaller, would also work for the purposes of this invention. The rotor is configured with suitable instrumentalities 25, as shown for example in FIGS. 18 and 26, mounted on the peripheral surface thereof that cooperate with the threshing cage to thresh the crops introduced therebetween. The threshing cage includes various semi-cylindrical concaves 34 and grates 36 provided along a lower arcuate portion of the cage. The rotor 28 is preferably made of steel, and is generally rotated at speeds of between 150 to 1500 rpm, depending on the type of crop being threshed, and the conditions under which the threshing is being performed. It should be understood, however, that the rotor speed is not critical to the operation of the invention, and that other rotor speeds, faster and slower, may be desired and suitable for the purposes of the present invention without detracting or departing from the scope thereof.

Figure 2:
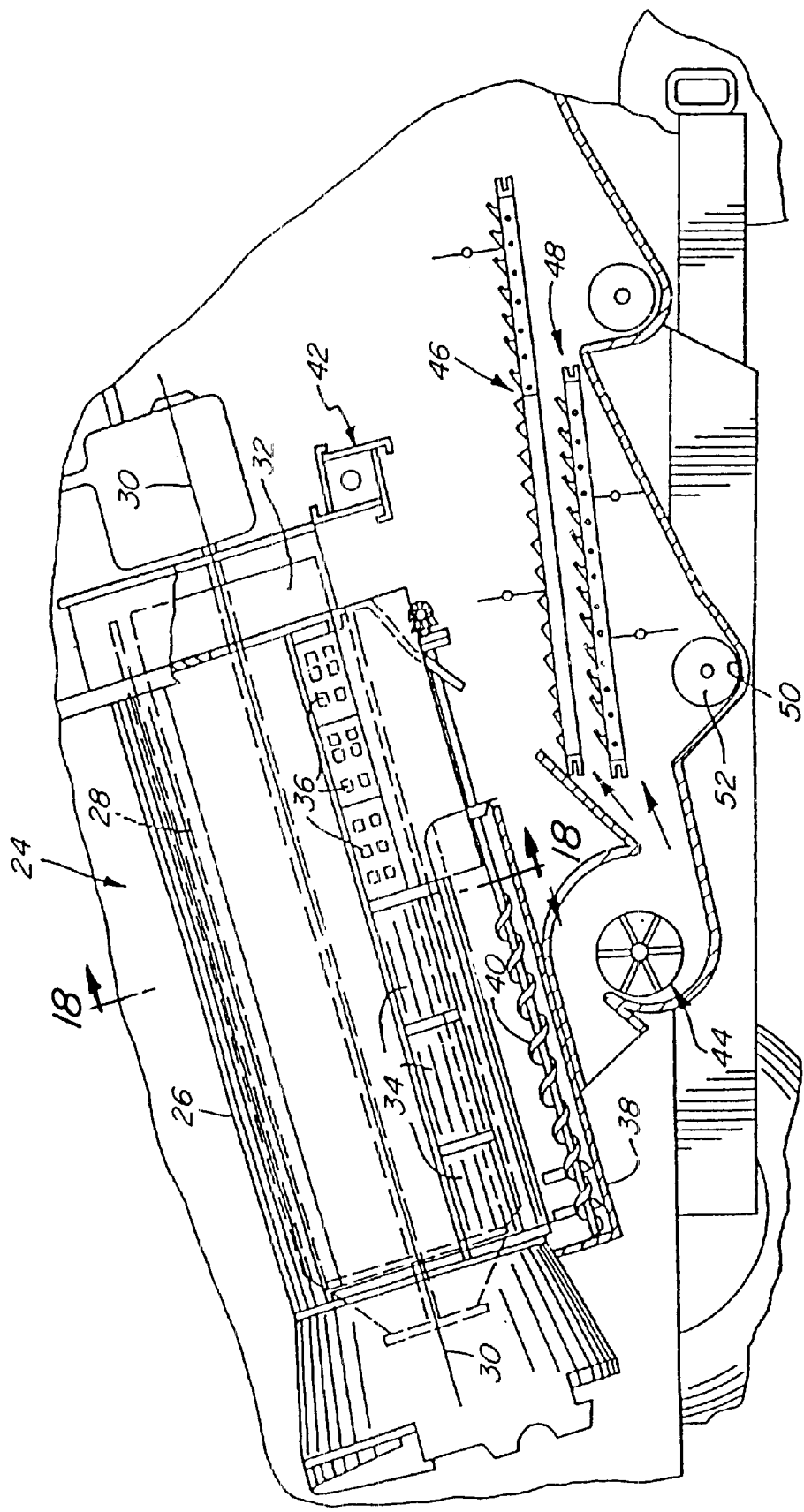
FIG. 2 is a partial side view of a separating apparatus for a rotary combine.

Referring to FIG. 2, the concaves 34 and grates 36 each have a plurality of apertures that allow the grain to be separated from the other crop materials as the grain passes through the apertures. Most of the grain drops onto a grain pan 38. The grain is thereafter conveyed rearward from the grain pan 38 by an auger mechanism 40 for subsequent cleaning and collection. Straw, tailings arid other waste crop material are impelled rearwardly out of the discharge end of the rotor assembly where a rotary beater throws the straw and other waste material rearwardly from the combine.

The combine 10 further includes a cleaning system for cleaning chaff, straw, tailings and other foreign material from the grain. For example, the cleaning system can include a cleaning fan 44, a chaffer sieve 46, a grain sieve 48 and a clean grain collector 50. A suitable auger mechanism 52 directs clean grain from the collector 50 into a hopper or grain bin. It should be understood that other cleaning systems would be suitable for the purposes of the present invention without detracting or departing from the scope thereof.

Now referring to FIGS. 3–6, an improved concave assembly and support structure therefor is shown. The concave assembly preferably includes a frame 60 and a plurality of concave inserts 80, shown in the preferred embodiment as six concave inserts.

The support structure 100 includes a pair of upper rails 102 extending longitudinally along opposite sides of the rotor, and a pair of lower rails 104 extending longitudinally along opposite sides of the rotor beneath the upper rails. In a preferred embodiment, the rails 102 have a Z-shape, and include an inwardly extending upper flange 108, an outwardly extending lower flange 110, and a vertical web 112 connecting the upper and lower flanges. The lower rails 104 are attached to a floor of the body 12 with a plurality of fasteners, such as bolts, or by welding and the like. A plurality of support legs 106 connect the upper and lower rails. The support legs 106 are attached to the upper and lower rails 102, 104 by welding, or with fasteners and the like.

Figure 18:
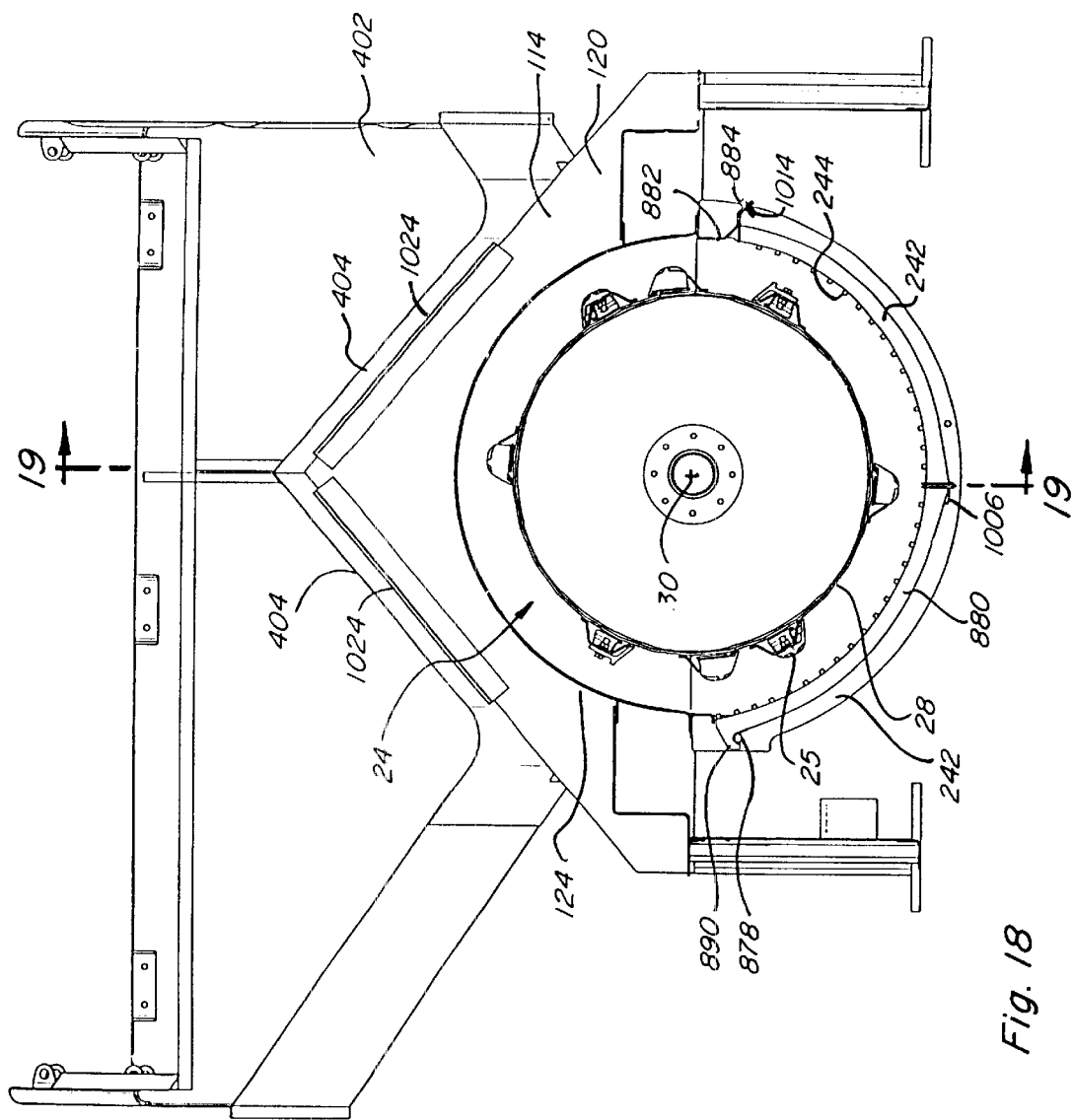
FIG. 18 is a partial section cut of the support structure, concave assembly, rotor and grain tank taken along line 18—18 in FIG. 2.
Figure 19:
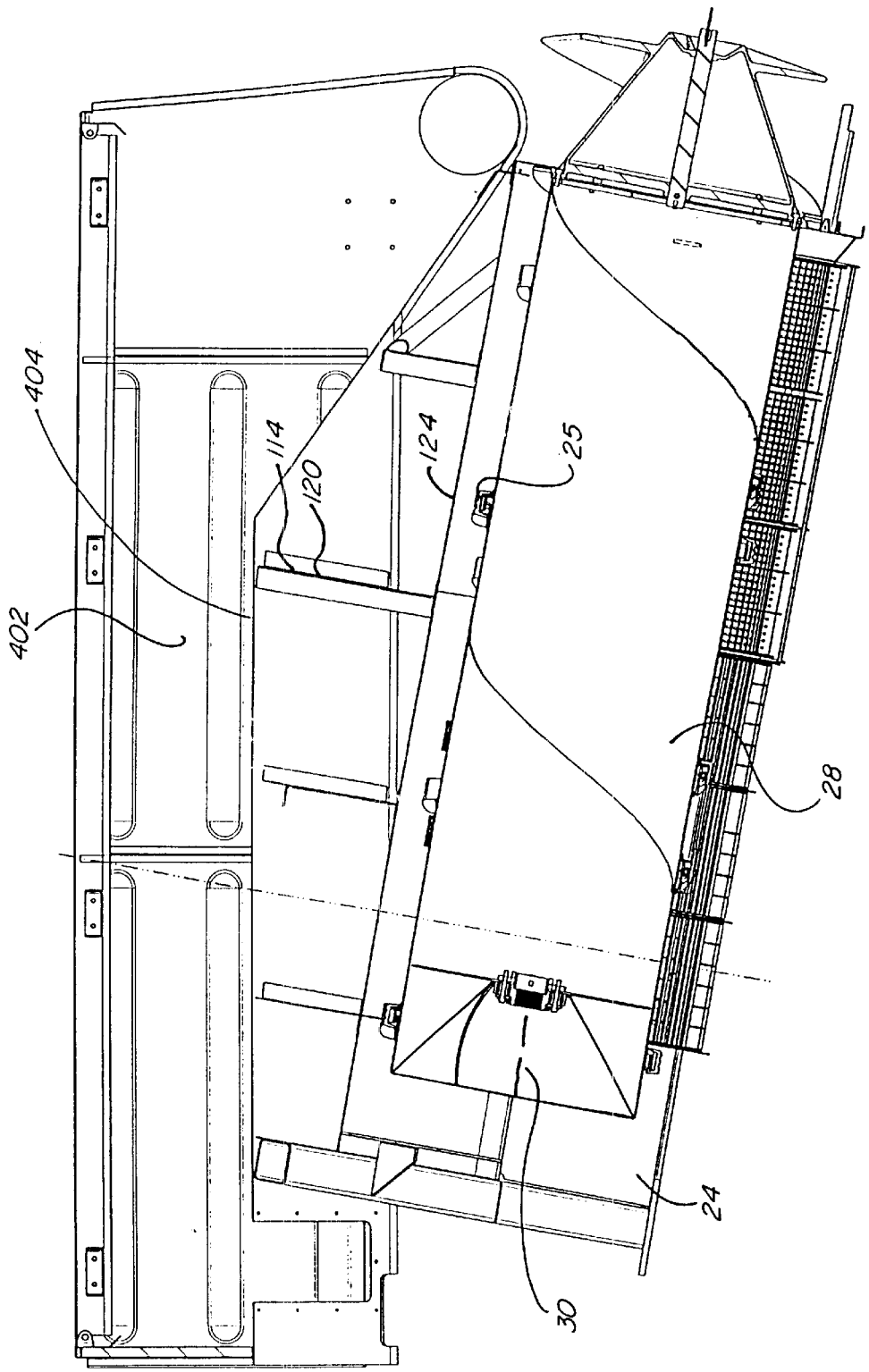
FIG. 19 is a partial section cut of the support structure, concave assembly, rotor and grain tank taken along line 19—19 in FIG. 18.

In addition, a series of transversely extending bulkheads 114 are longitudinally spaced along the top of the upper rails. The bulkheads 114 extend between and connect the upper rails 102. The bulkheads 114 are further attached to the bottom of the grain tank 402, shown in FIGS. 18 and 19. The bulkheads 114 are preferably made of steel, and are attached to the upper rails 102 by welding or with fasteners. The bulkheads 114 each include a pair of inclined upper edges 116, and a lower arcuate-edge 118, which includes a semi-cylindrical flange that extends partially, circumferentially around the rotor 28 disposed therebelow. The upper edges 116 of the bulkheads support a floor 404 of a grain bin disposed thereabove, as shown for example in FIGS. 18 and 19. Preferably, the inclined edges 116 are each formed at an angle of about 40 degrees to the vertical, although it should be understood that other angles would also work. The bulkhead includes a support web 120 extending between the upper and lower edges. A spine member 122 extends longitudinally along the length of the support structure and connects a center top portion of the bulkheads. The spine 122 is preferably made of steel and is secured to each of the bulkheads by welding and/or fasteners. A forward portion of the spine is comprised of two frame members that extend downwardly from the upper portion of the forwardmost bulkhead to a plate member attached to the end of each upper rail. As best shown in FIGS. 18 and 26, sheet members 1024 are installed on top of the bulkheads. A series of arcuate, semi-cylindrical covers 124, best shown in FIGS. 26 and 27, extend between and connect the lower portions 118 of the bulkheads and prevent the grain and other crop materials from getting into the space defined thereabove as those materials are threshed and rotated with the rotor 28.

Figure 14:
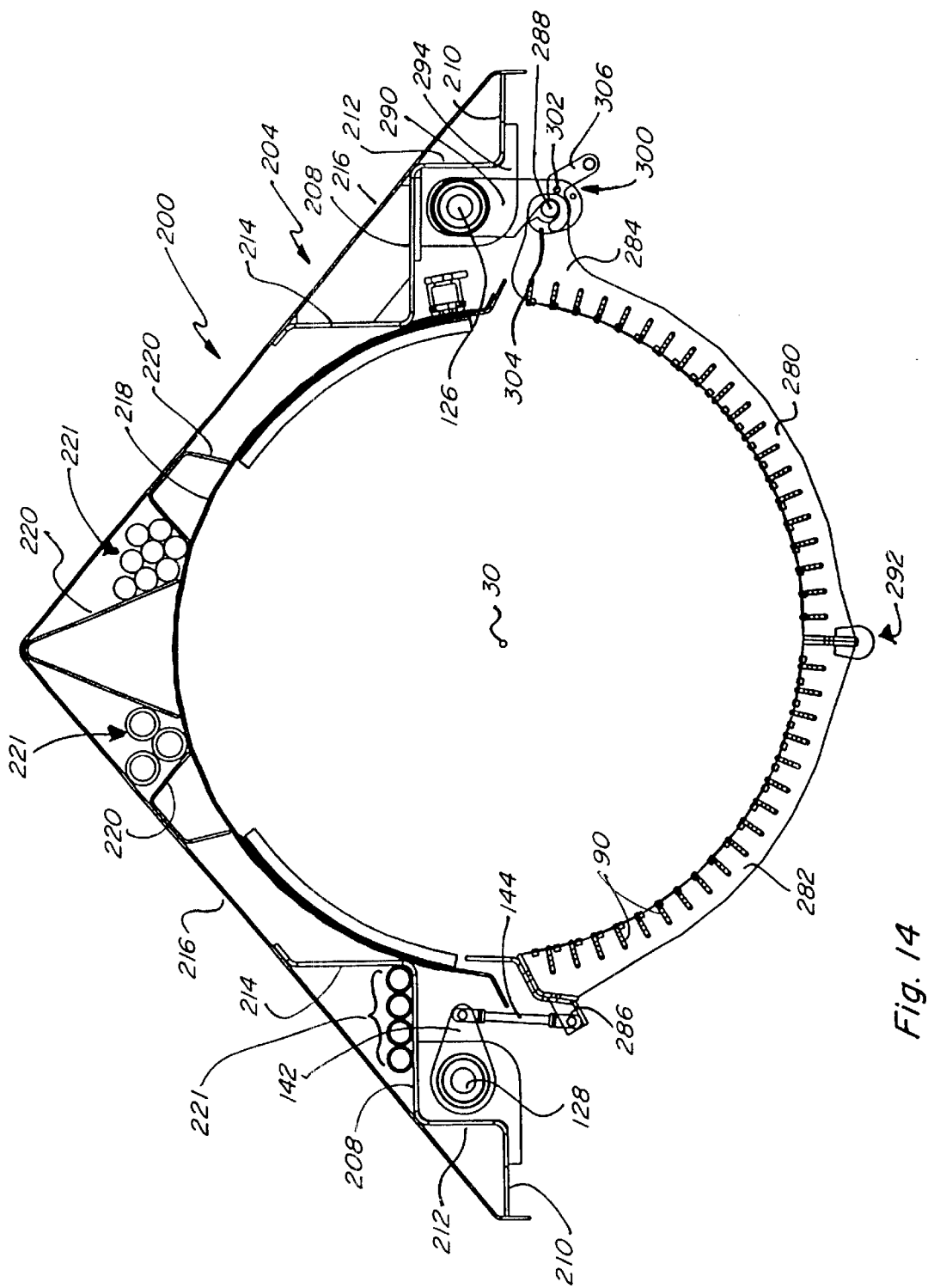
FIG. 14 is an end view of an alternative embodiment of a concave assembly supported from an alternative embodiment of a support structure with a locking device in an engaged position.

In an alternative embodiment, shown in FIG. 14, the support structure includes a truss 204 overlying the rotor. The truss includes a pair of upwardly inclined and intersecting upper surfaces 216, which support and help define a floor of the grain bin formed thereabove. A lower portion 218 of the truss extends partially circumferentially around the rotor. The upper surfaces 216 and lower portion 218 are connected with a plurality of support members 220 extending therebetween. In the preferred embodiment, modified Z-shaped rails 202 with an upper flange or web 208, lower flange 210, vertical web 212 and an additional upstanding flange 214 connect the upper and lower portions 216, 218 along a lower end of the truss. It should be understood that the truss can extend longitudinally along the length of the rotor, with the upper and lower portions and connecting support members each extending therealong.

Alternatively, a series of transversely extending trusses can be longitudinally spaced along the rotor in an overlying relationship thereto, with only the upper rails 202 extending longitudinally along the rotor. In this embodiment, lower cover members can be provided to extend between and connect the lower portions of the trusses.

In either embodiment, the spaces formed between the upper and lower portions 216, 218, and between the support members 220, provides an ideal, protected location for passing utilities 221, such as conduit, fluid lines, cables, wiring and the like, between the front and back of the combine. Similarly, openings can be provided in the bulkheads referenced above to provide passage for these utilities. These various utilities can be easily attached and supported by the support structure with various clips and the like, which can be fastened, for example, to the support members or to the web of the bulkheads.

Referring to FIGS. 3–9, 11, 14, and 20, the support structure further includes a first and second pivot shaft 126, 128, otherwise referred to as rock shafts, extending longitudinally beneath the upper rails 102 on opposite sides of the support structure, with the pivot shafts circumferentially spaced around the rotor 28. Each pivot shaft 126, 128 defines respectively axes 130, 132 of rotation that are substantially parallel to the axis 30 of rotation of the rotor and to each other. Each pivot shaft, preferably formed as a tube, is rotatably supported by a series of bearing supports 134, which in turn are attached to either to a bottom of the flange 108 of the respective upper rail 102 with a bracket 136, or to the end of the rail, which includes a plate member 138 attached thereto. The shaft alternatively can be configured as a solid axle, or can be comprised of a plurality of shorter support pins spaced longitudinally along the support structure. In a preferred embodiment, the first shaft 126 which rotates on the right side of the rotor 28, is supported at four points, while the pivot shaft 128 on the left side is rotatably supported at two points.

As best shown in FIGS. 6–9, 11, and 20, a plurality of longitudinally spaced crank arms 140 (shown as four) extend radially from the first pivot shaft 126 Three of the crank arms 140 are dual crank arms having two arm members forming a space therebetween for receiving a mating member. The rearwardmost crank arm preferably includes only a single arm member. It should be understood that any or all of the crank arms could be configured with single or dual arm members. In a preferred embodiment, the crank arms 140 extend radially downward from the first pivot shaft 126 in a substantially, vertical direction. A plurality of longitudinally spaced dual crank arms 142 (shown as two) extend radially from the second pivot shaft 128. In a preferred embodiment, the crank arms 142 extend radially inward from the pivot shaft 128 in a substantially horizontal direction. A plurality of link members 144 (shown as two) each include a first and second end 146, 148, with the first end 146 pivotally connected to an end 152 of the crank arm 142 with a pin or like member. It should be understood that the number of crank arms and bearing supports could be increased or decreased as desired.

Figure 20:
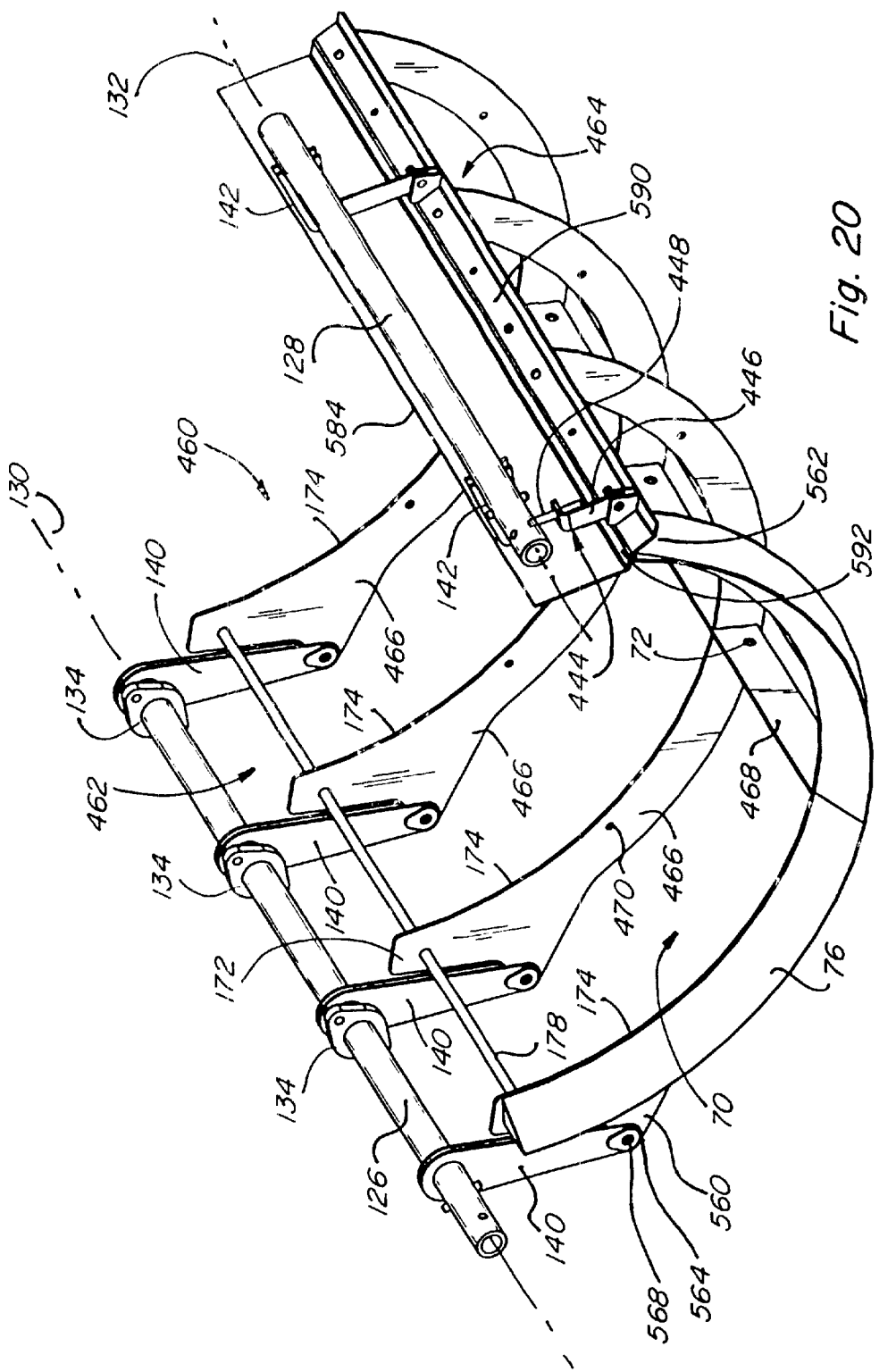
FIG. 20 is a left side perspective view of an alternative embodiment of the frame and support structure.
Figure 23:
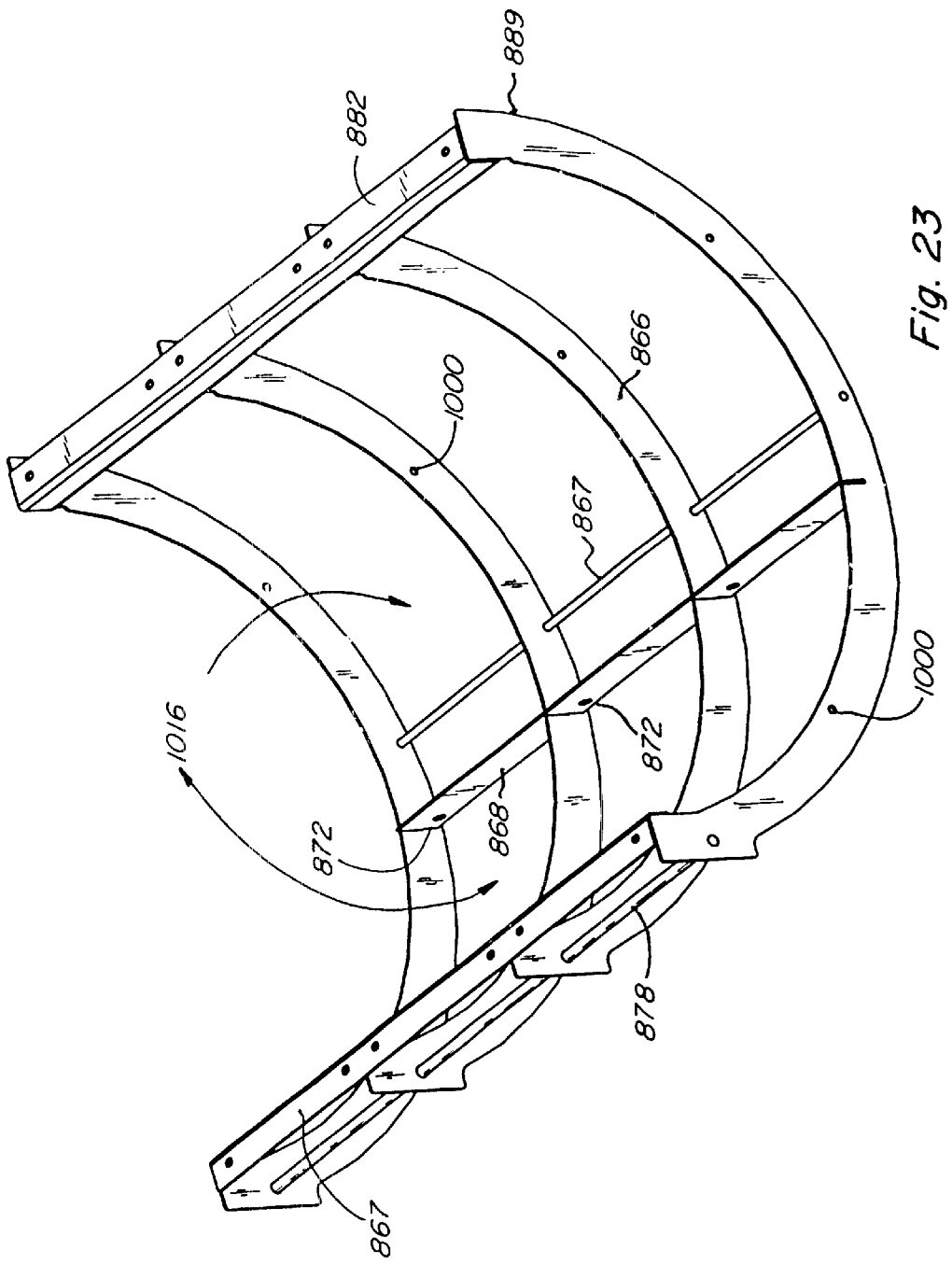
FIG. 23 is a perspective view of a support frame for the separating grates.

In the alternative embodiment shown in FIG. 20, the forward most link member 444 includes a bracket member 446 adjustably connected with an adjustment member 448. Preferably, the adjustment member 448 is formed as a bolt, which threadably engages the bracket member. The adjustment member can be actuated by rotation to adjust the frame up or down along the length of the adjustment member, which preferably extends in a substantially vertical direction.

Referring to FIGS. 7–9 and 20, the frame 60, 460 of the concave assembly extends longitudinally and has first and second sides 62, 64, 462, 464 spaced circumferentially around the rotor. In a preferred embodiment, the first and second sides 62, 64, 462, 464 preferably are spaced between about 160 degrees to about 190 degrees relative to each other, and more preferably at about 180 degrees, although it should be understood that the sides can be spaced at lesser angles, e.g., 120 degrees, or even less. The frame 60, 460 includes a plurality of rib members 66, 466 extending transversely between the first and second sides 62, 64, 462, 464 of the frame. The rib members 66, 466 are arcuate shaped with an upper arcuate edge 174 preferably having a radius substantially the same as or slightly greater than the radius of the rotor. More preferably, the upper peripheral edge of the right half of the rib member has a slightly larger arc than the upper peripheral edge of the left side, with the right hand and left hand arcs therefore having slightly different radii.

Figure 7:
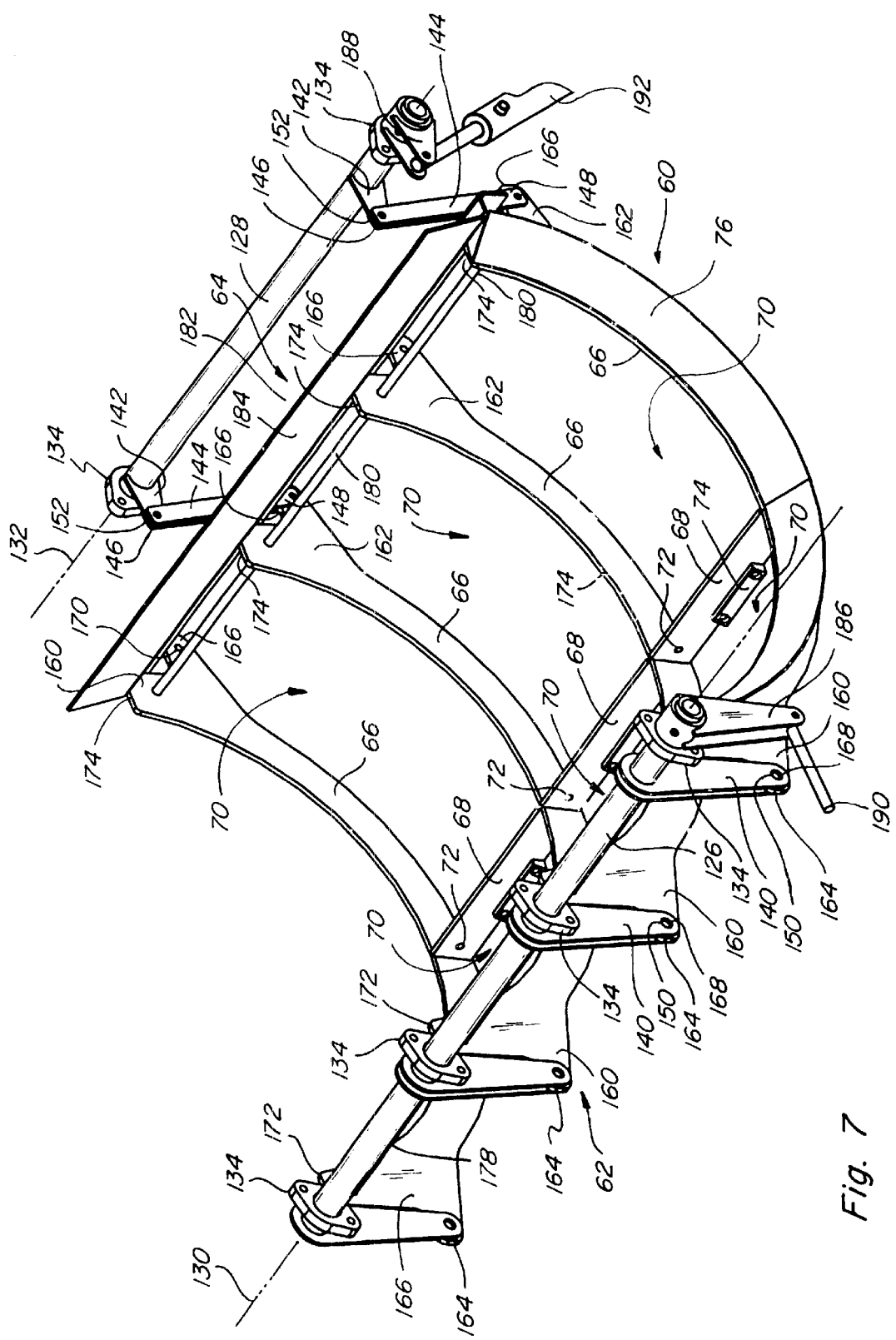
FIG. 7 is a right side perspective view of the frame and support structure shown in FIG. 6.

The rib members 66, 466 are longitudinally spaced and form a series of openings 70 between successive rib members. For example, as shown in FIGS. 7 and 20, the four rib members 66, 466 form three openings 70 therebetween, each of which is further subdivided into two sub-openings by a longitudinally extending frame member 68, 468, which extends between the rib members 66, 466 along a central intermediate portion thereof between the first and second sides of the frame. It should be understood that more or less rib members could be used to define more or less openings therebetween, depending on the number of concave inserts to be supported by the frame. Each frame member 68 includes a pair of holes 72 formed therein and a support member 74, formed as a block, attached to both sides thereof with a pair of fasteners along a bottom edged thereof. The support member 74 provides a rest or support for an end of a concave insert while it is being installed and before any securing fasteners are secured. The forwardmost rib member 66, 466 abuts a forwardly extending and downwardly inclined flange 76 formed on the support structure which cooperates with the infeed mechanism to prevent grain from escaping through the space formed therebetween.

Each rib member 66 includes a first and second end 160, 162, each of which includes an outwardly extending lower lug 164, 166 having an opening 168, 170 therethrough. The lower lugs 164 and 166 are attached respectively to the crank arm 140 and link 144 at openings 168 and 170, respectively. Each lower lug 164, 166 is downwardly displaced with respect to a top portion 172, 174 of the end of the rib member, with the lug 164 on the end 160 preferably being more displaced than the lug 166 on the other end 162, such that as the frame 60 is translated, as more fully explained below, the geometry of the lugs 164, 166 and openings 168, 170 permits the concave assembly to maintain the proper cooperative relationship with the rotor. In an exemplary embodiment, it is desirable to maintain the concave assembly a radially spaced distance of from about 0 to about 2 inches, although it should be understood that greater distances may also be desirable in certain applications. In addition, it may be desirable to have a slightly large space or gap formed between the rotor 30 and the concave assembly along the right side thereof, with the gap slowly diminishing as one follows the concave circumferentially along its circumferential span, otherwise defined as the inner circumferential distance between the opposite ends of the concave. In this way, the rotor, which rotates counterclockwise when viewing it from the front looking back, introduces the crop material into a larger gap at the right side of the concave with the gap gradually diminishing between the rotor and concave from right to left.

Figure 11:
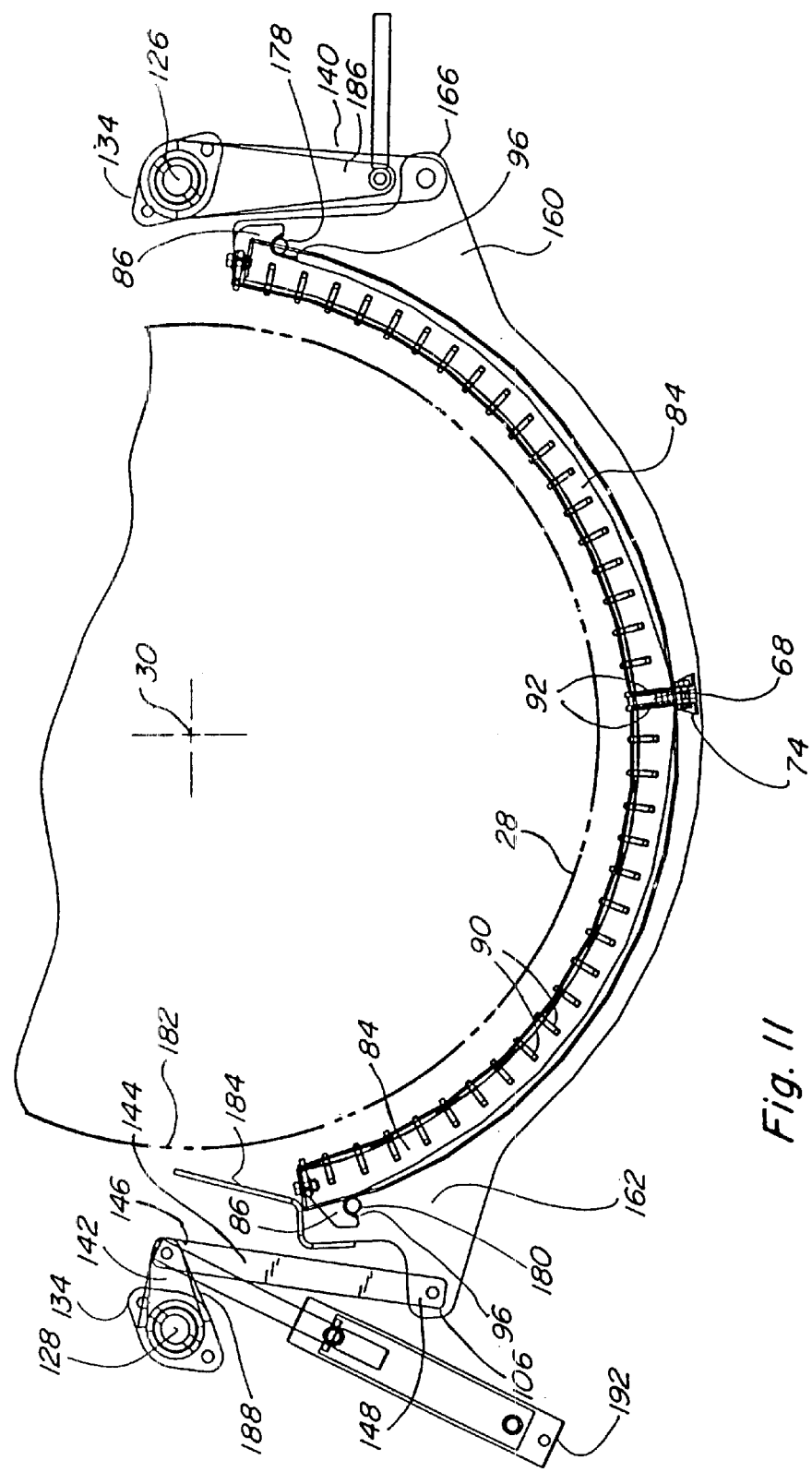
FIG. 11 is an enlarged, partial end view of the concave assembly and support structure shown in FIG. 3.

Referring to FIGS. 7 and 11, a pivot member 178, preferably configured as a shaft or axle, extends longitudinally through each end of the rib members 160 along a first side 62 of the frame, while a pivot member 180, also preferably configured as a shaft or axle, extends longitudinally through each end 162 of the rib members along a second side 64 of the frame. The pivot members 178, 180 are connected with each rib member 66 adjacent a top portion of each end 160, 162 thereof above the lug members 164, 166. An upwardly extending Z-shaped sealing bracket 182, which extends longitudinally along the frame, is mounted to the end 162 of the rib members. The sealing bracket 182 includes an upwardly extending flange 184, which cooperates with the lower edge of the cage assembly or the cover attached to the support structure to close the gap between the frame and the support structure, so as to prevent grain from escaping through the space formed therebetween.

Referring to the alternative embodiment of the frame shown in FIG. 20, each rib member 466 includes a first and second end 560, 562. The first end 560 includes an outwardly extending lower lug 564 having an opening 468 therethrough. The lower lug 564 is downwardly displaced with respect to a top portion 572 of the end of the rib member. A pivot member 578, preferably configured as a shaft or axle, extends longitudinally through each end of the rib members 560 along a first side 462 of the frame. The pivot member 578 is connected with each rib member 466 adjacent the top portion 572 of end 560 above the lug member 564. On the second side 464 an upwardly extending Z-shaped sealing bracket 582, with flanges 584 and 590 connected with web 592 which extends longitudinally along the frame, is mounted to the end 562 of the rib members. In addition, the lower end of the links 144 and 444 are attached to lugs extending from or through the bracket 582.

Figure 8:
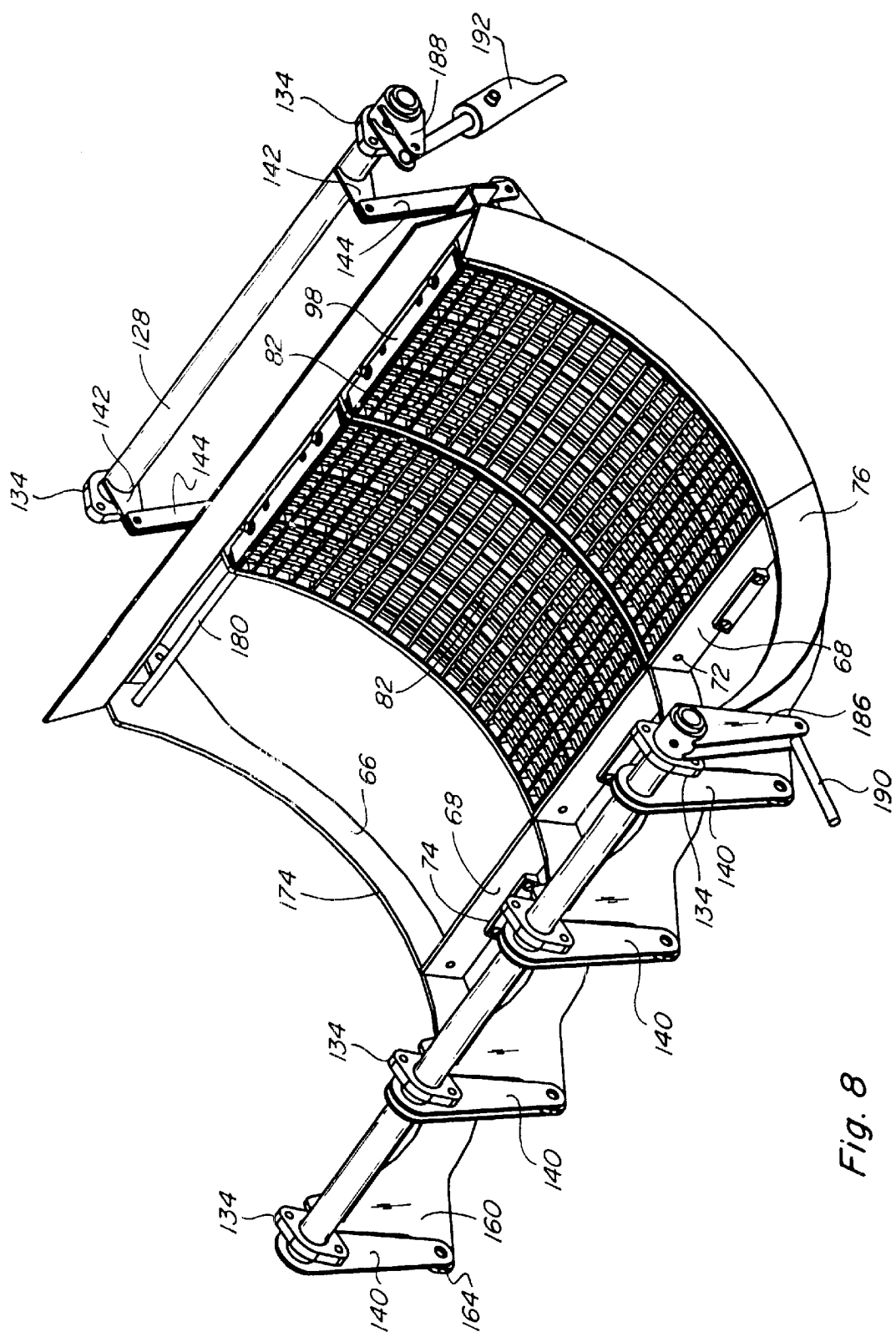
FIG. 8 is a right side perspective view of the frame and support structure of FIG. 7 with a pair of concave inserts positioned in a side-by-side configuration.
Figure 9:
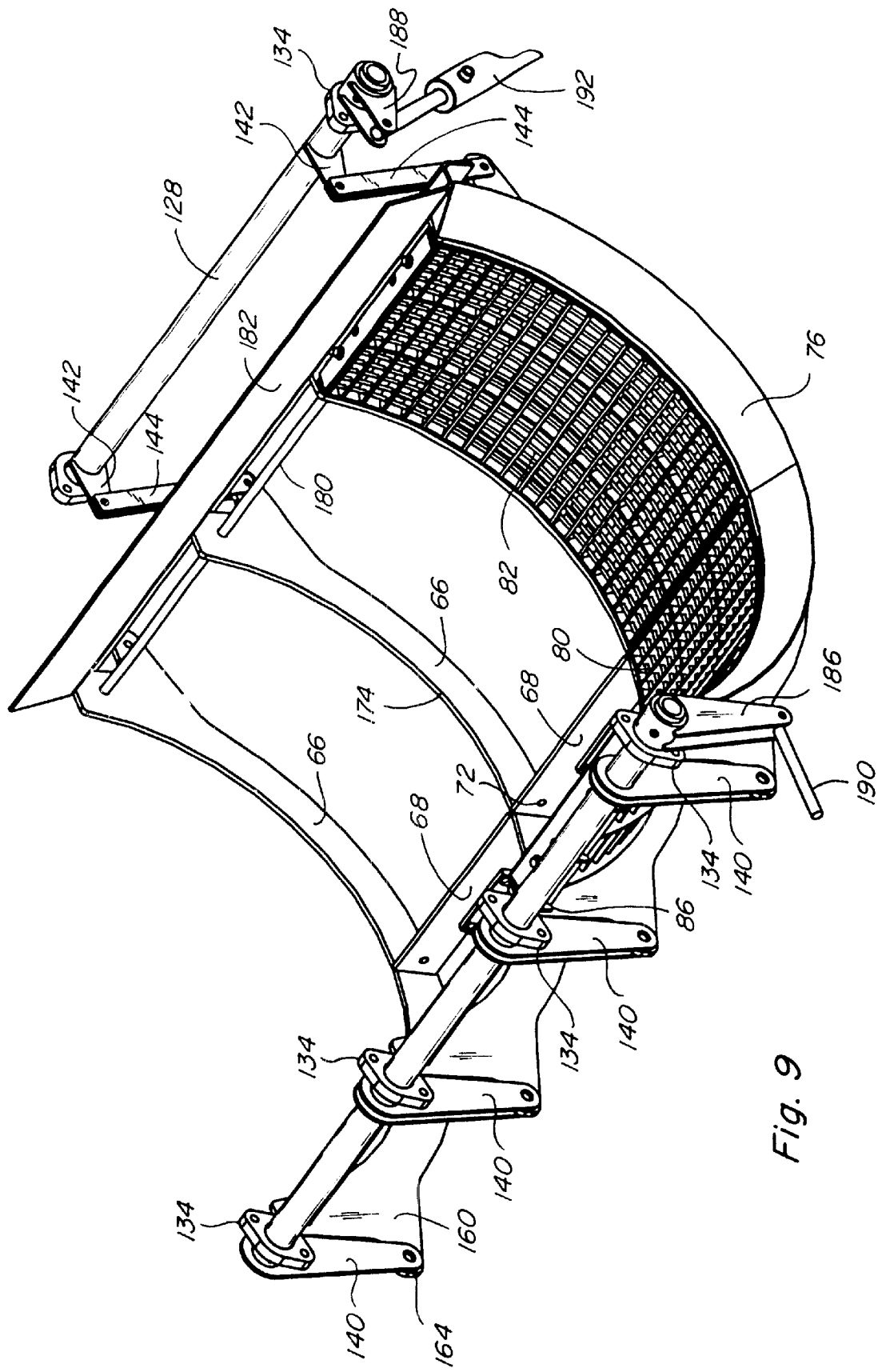
FIG. 9 is a right side perspective view of the frame and support structure of FIG. 7 with a pair of concave inserts positioned in an end-to-end configuration.

Referring to FIGS. 7–9, a dual crank arm 186 is attached to and extends radially from an end of the pivot shaft 126. Similarly, a dual crank arm 188 extends radially from an end of pivot shaft 128. A first and second actuator 190, 192 are operably engaged with the crank arms 186, 188 respectively so as to effect a rotation of the pivot shafts 126, 128 respectively. An exemplary actuator mechanism is shown in U.S. Pat. No. 5,489,239, which was referred to above, and which has been incorporated herein by reference. Alternatively, it should be understood that the crank arms 186, 188 can be manipulated or actuated by any number of conventional and well-known systems, including pneumatic and hydraulic cylinders, worm gears, racks, threaded members, turnbuckles, servo devices, and the like.

In operation, the actuators 190, 192 are preferably linearly actuated to rotate the pivot shafts 126, 128. As the first pivot shaft 126 rotates in response to movement of actuator 190 and crank arm 186, the end 150 of the downwardly extending crank arm 140 pivots about the pivot axis 130 and thereby moves the pivotally attached ends 160 of the rib members, or side 62 of the frame, and in particular, the point of pivotal attachment between the rib member and the crank arm, in a transverse, lateral direction. It should be understood that the term transverse means any direction, not necessarily linear, within the plane formed perpendicular to the longitudinal axis 30 of rotation of the rotor and the pivot axes of the pivot shafts 130, 132. The rotation of the first pivot shaft 126 and the attendant movement of the first side 62 of the frame also effects a transverse, lateral movement of the second side 64 of the frame as it pivots about the end 148 of the link member, which in turn pivots about the end of the crank arm. In essence, the rib members 66, links 144, crank arms 140 and support structure act as a 4-bar linkage which effects a transverse, translation of the frame member in a lateral direction relative to the rotor 28. If the links 144 are not parallel, or of the same length as the arms 140, the frame may also be slightly rotated as it is translated.

As the second crank arm 142 is independently rotated by actuator 192 and crank arm 188, the end 152 of the crank arm 142 moves the link member 144 in a substantially transverse, vertical direction, which thereby moves the ends 160 of the rib members, or side 64 of the frame, in a vertical direction. It should be noted that this movement does not effect a similar movement of the other side of the frame, which cannot be moved vertically due to the direct pivotal connection with the crank arm 140. Rather, the second side 64 of the frame is pivoted about the pivot point 168 or the connection between the first side 62 of the frame and the crank arm 140.

In summary, in the preferred embodiment, rotation of the pivot shaft 126 on the right side effects a transverse, lateral movement of the entire concave assembly, comprised of a primary translation component and potentially a small secondary rotation component, while a rotation of the pivot shaft 128 on the left side effects a pivoting of the concave assembly about the pivotal attachment of the frame 60 to the crank arm 140.

Figure 10:
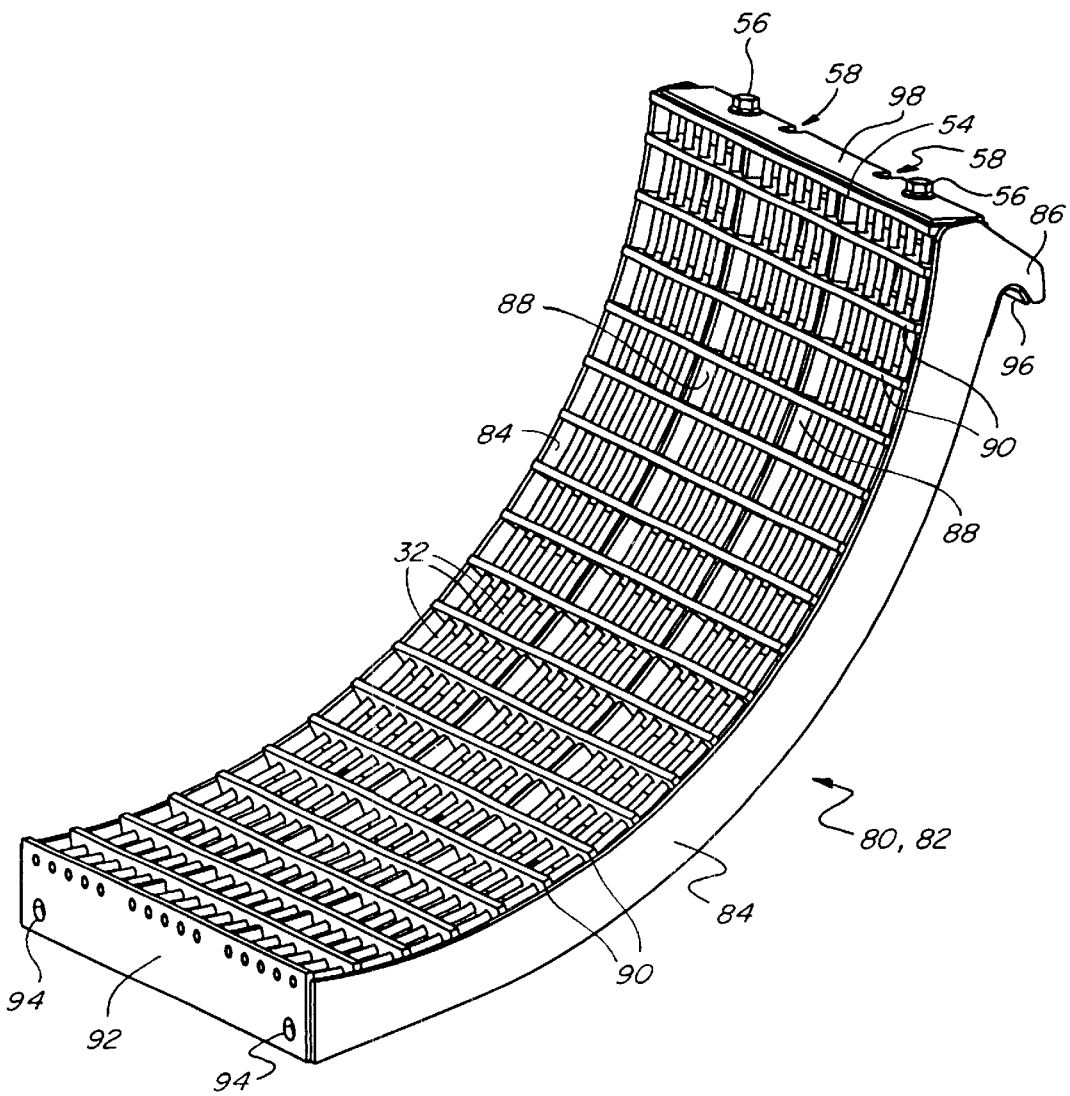
FIG. 10 is a perspective view of a concave insert.

Now referring to FIGS. 8 and 9, a plurality of concave inserts 80, 82 are shown as being releasably mounted to the frame 60 in a side-by-side configuration and an end-to-end configuration respectively. As shown in FIG. 10, each concave insert 80, 82 is arcuate shaped, with a circumferential span of approximately 90 degrees. The concave inserts 80 configured in a side-by-side relationship on the right side of the assembly preferably each have an arcuate shape defined by an upper concave surface of one profile, while the concave inserts 82 configured in a side-by-side relationship along the left side of the assembly preferably have an arcuate shape defined by an upper concave surface of another profile. Preferably, the concave insert 80 on the right side has a slightly larger radius than the concave insert 82 on the left side, with both concave inserts 80, 82 having radii slightly larger than the radius of the rotor. For example, in one suitable embodiment, the rotor has a radius of about 18 inches, while the concave insert 80 has a radius of about 20.5 inches and the concave insert 82 has a radius of about 20 inches. It should be understood that the radius of each individual concave insert also could be varied along the circumference thereof. Conversely, it should be understood that the concave inserts could also be made modular, with the same radius of curvature.

In the preferred embodiment, the concave assembly includes six concave inserts, with three concave inserts arranged in a side-by-side relationship along each side of the concave assembly, and with each of the three concave inserts arranged side-by-side on the right side further arranged in an end-to-end relationship with the three concave inserts arranged side-by-side on the left side. It should be understood that more or less concave inserts could be arranged in both the longitudinal (side-by-side) direction and in the transverse (end-to-end) direction depending on the longitudinal extent or length of the frame and on its circumferential span or width.

As best shown in FIG. 10, each concave insert 80, 82 includes opposite transversely extending side frame members 84 or ribs, which terminate along one end in a downwardly extending hook portion 86. Two intermediate frame members 88 also extend transversely along the cicumferential span of the concave insert 80, 82. A plurality of longitudinally extending frame members 90, configured as bar members, extend between and are connected to the opposite side frame members 84 and intersect the intermediate frame members 88. The lowermost frame member 92, which defines an end of the concave insert, includes at least a pair of openings 94 formed in a lower portion thereof. Along the opposite end, a curved bearing plate 96 extends longitudinally between and nests in the opposite hook portions 86 and forms itself a hook. A plate member 98 is secured to the uppermost frame member 54 with at least a pair of bolts 56 and includes a pair of slotted openings 58 opening outwardly along the bottom of the plate member. The concave inserts 80, 82 also include a plurality of longitudinally spaced arcuate rods 32 that extend between the ends of the concave insert through the plurality of bar members below a top edge thereof. The spaces or openings formed between the rods, bar members and frame members form apertures through which the grain passes as the crop materials are threshed between the concave insert 80, 82 and the adjacent, cooperating rotor 28. In various suitable embodiments, the openings have a range of widths from about a ¼ inch to about ⅜ inch and a length of from about 1 inch to about 1½ inches, depending on the type of grain being threshed. The various concave insert components, including the frames 84, 88, rods 32, bearing plates and plates 98, are preferably made of steel, although other materials would also work.

In an alternative embodiment, shown in FIGS. 20 and 21, the right side concave 80 further includes a pair of openings 700 formed about midway in the frame members 84 or ribs. The left side concave insert 782 is similar to concave insert 82, but the frame members 784 do not terminate in a hook portion. Rather, a frame member 702, formed as a plate, includes an outwardly extending flange 704, which is preferably angled slightly from the end of the concave insert. On the other end of the concave insert 782, a pair of posts or pins 706, each having a tapered or frusto-conical end portion 708, extend from frame member 92. The pins 706 are dimensioned to be received in the openings 94 formed in the end of the concave insert 80.

To install the concave inserts 80, 82, one of the concave inserts, for example the right concave insert 80, is introduced transversely through one of the subopenings 70 formed between one pair of rib members 66 making up the frame 60. The hook portions 86 on the end of the concave insert, with its curved bearing plate 96, is disposed on the pivot member 178 so as to be pivotally engaged therewith. The opposite, lower end of the concave insert 80 is then pivoted about the pivot member 178 until the holes 94 in the lowermost plate member 92 are aligned with the holes 72 in the frame member 68. The opposite side insert 82 can be similarly installed and pivoted about pivot member 180 into position, whereinafter a bolt or like fastener can be installed through each of the lower most plate members 92 and the frame member 68 to releasably secure the concave inserts 80, 82 to the frame member 66 and to each other. During these operations. the lower ends of the concave inserts can be rested on the support member 74 to ease the load on the installer and to facilitate the installation of the inserts Alternatively, it should be understood that the ends of the concave inserts can be individually secured to the plate member with fasteners. In yet another alternative, the longitudinally extending frame member is omitted, and the lowermost plate members abuttingly engage, whereinafter they can be fastened together with bolts, screws and the like. It should be understood that bolts or other like fasteners can also be installed through the side frame members so as to attach the side flanges to the adjacent rib members or to the side frame members of the next concave insert arranged along the side thereof. When installed, the upper arcuate edge of the frame members is substantially flush with the arcuate top edge 174 of the adjacent rib members 66.

To remove one of the concave inserts 80, 82, substantially the reverse operation is followed. In particular, the fasteners securing the lowermost plates 92 are removed, and the lowermost end of the concave insert 80, 82 is pivoted through the opening 70 between the rib members about the pivot member 178, 180 in an outwardly transverse direction away from the rotor 28. The right side concave insert 80 is pivoted clockwise about pivot member 178 when viewing the assembly from the front looking back. The left side concave insert 82 is pivoted in an opposite counterclockwise direction about pivot member 180. The bearing plate 96, with the supporting hook portions 86, can thereafter be disengaged from the pivot members 178, 180. A replacement concave insert 80, 82 can thereafter be installed in the manner described above. In operation, it may be desirable to remove or replace one or more concave inserts with concave inserts having different size apertures when different crops are being harvested. It may also be desirable to remove or replace one or more concave inserts if they become damaged, for example, by the introduction of a foreign object such as a rock between the concave insert and the rotor. The above configuration and sequence of installation greatly facilitates the removal and replacement of the inserts.

In particular, by providing two concave inserts that form the circumferential threshing span, the inserts can be made lighter, while at the same time providing for a larger overall threshing span. It should be understood that the circumferential span could be further divided by three, or even mole. concave inserts, with additional concave inserts supported by the frame between the two concave inserts releasably mounted as described herein, but with their lower ends circumferentially spaced. In this way, the circumferential spans of the concave inserts could be reduced even more, thereby making them lighter and less bulky. Similarly, since the frame, which is affixed to the support structure, is constructed to absorb the threshing loads, the concave inserts can be made with smaller side frame members, thereby also making them lighter and more manageable for the user or installer. In addition, the transverse removal of the concave inserts from the side of the frame eases the burden of replacement as the insert can be accessed and replaced from the side of the combine, when configured with an axially extending rotor, without disturbing the installation of the other concave inserts.

In an alternative embodiment, best shown in FIGS. 20–22, the right side concave insert 80 is installed first by pivotally engaging the pivot member 178 with hook portion 86. The concave insert is pivoted into position and fasteners, preferably bolts, are installed though opening 470 in the frame rib member 466 and opening 700 in the concave insert frame member 84. In this position, the openings 94 are aligned with the openings 72 formed in the frame member 468. Next, the left side concave insert 782 is installed by inserting the pins 706 through the openings 72 and into the openings 94 formed in the right side concave insert. The concave insert 782 is then pivoted into position. The end member 702 is then secured to the flange 590 of the bracket with fasteners. The concave insert 782 can be further secured to the rib members 466 with fasteners passing through openings 700. It should be understood that the bolts securing the frame members 84 on either insert 80 and 782 are optional.

Figure 16:
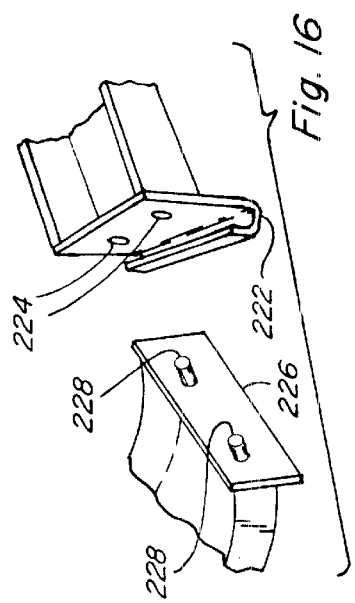
FIG. 16 is a partial perspective view of an alternative embodiment of a pair of concave inserts.
Figure 17:
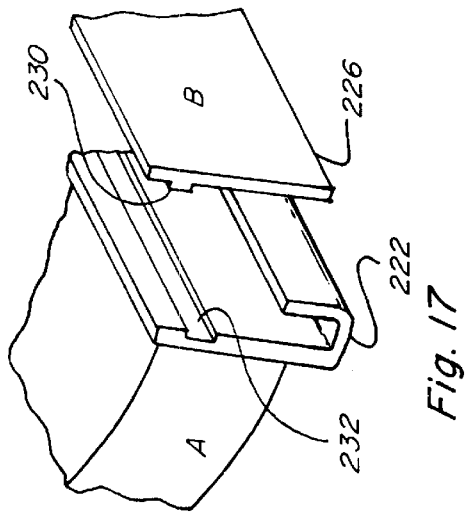
FIG. 17 is a partial perspective view of an alternative embodiment of a pair of concave inserts.

Now referring to FIGS. 16 and 17, alternative methods of connecting abutting concave inserts arranged in an end-to-end configuration are shown. In these embodiments, the frame member 68 has been eliminated, or, the frame itself has been omitted, with the concaves being directly attached to the support structure. As used herein, the term concave is meant to refer to a concave insert supported by a frame, or to a concave member that is directly secured to the support structure without a separate supporting frame.

In FIG. 16, the lowermost end of one concave is configured with a longitudinally extending bottom hook portion 222 forming a channel opening upwardly along one end thereof. A pair of openings 224 are formed in the plate member above the hook portion. The lowermost end of the mating concave is configured with a pair of transversely extending post members 228 dimensioned to be received in the openings 224 of the plate member. In operation, the bottom edge 226 of the plate member is inserted into the channel of the hook portion 222, while the post members 228 are received in the openings 224. Because the threshing loads are applied radially outward along the circumferential span of the concaves, the interface of the abutting concaves reacts out the load through a moment applied by the bottom edge 226 of the plate member pulling on the hook portion, and an engagement between the upper portions of the abutting plates. The post members 228 engaged with the holes 224 further absorb the shearing loads applied between the concaves and maintain the engagement between the concaves.

In an alternative embodiment, shown in FIG. 17, a longitudinally extending tongue portion 230 formed along one plate member engages a groove 232 on the mating plate member so as to absorb any shear load between the abutting concaves.

In an alternative embodiment, the concave assembly does not include a supporting frame. In this embodiment, shown in FIG. 14, the concave assembly includes a plurality of left and right side concaves 280, 282 with side frame members each having lug portions 284, 286 extending transversely from the uppermost ends thereof. On the left side, a sealing bracket is attached to the end of the concave and includes the lug portion 286. In this embodiment, the right side concaves further include a pivot member 288 that extends longitudinally between the lug portions of the side frame members. The pivot member 288, configured as a shaft, is engaged by a hook portion 290 connected to and extending downwardly from the overlying support structure 200. The hook portion 290 can be pivotally attached to the overlying support structure. The interface 292 of the lowermost ends of the concaves arranged in an end-to-end configuration can be connected using any of the methods described above. For example, they can be connected with fasteners or with an edge/hook engagement and mating shear components. In the embodiment of FIG. 14, the side frame members of the concave 280, 282 are made more robust such that they can carry the threshing loads applied thereto to the overlying support structure.

Figure 12:
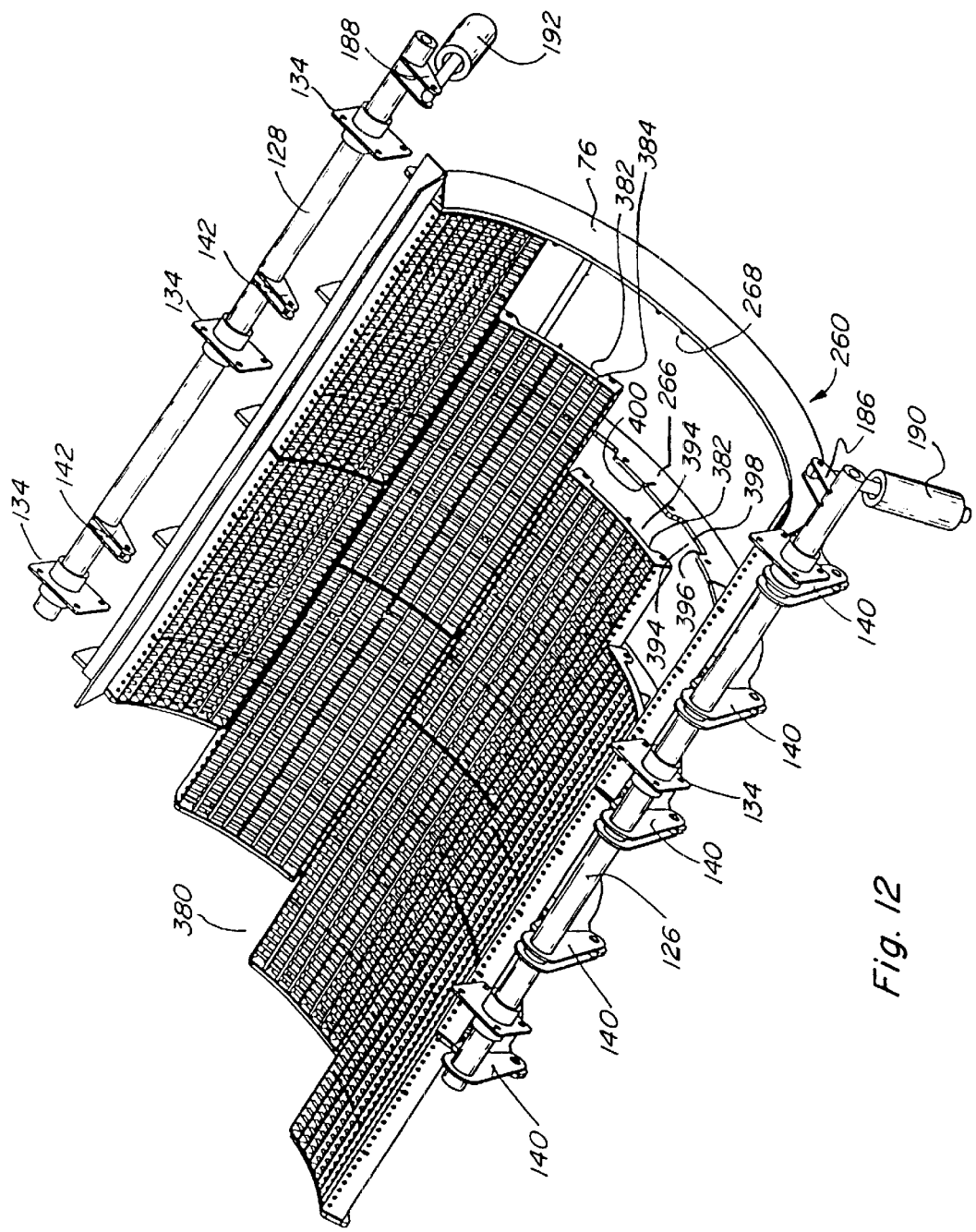
FIG. 12 is a right side perspective view of an alternative embodiment of a concave assembly supported by a support structure.
Figure 13:
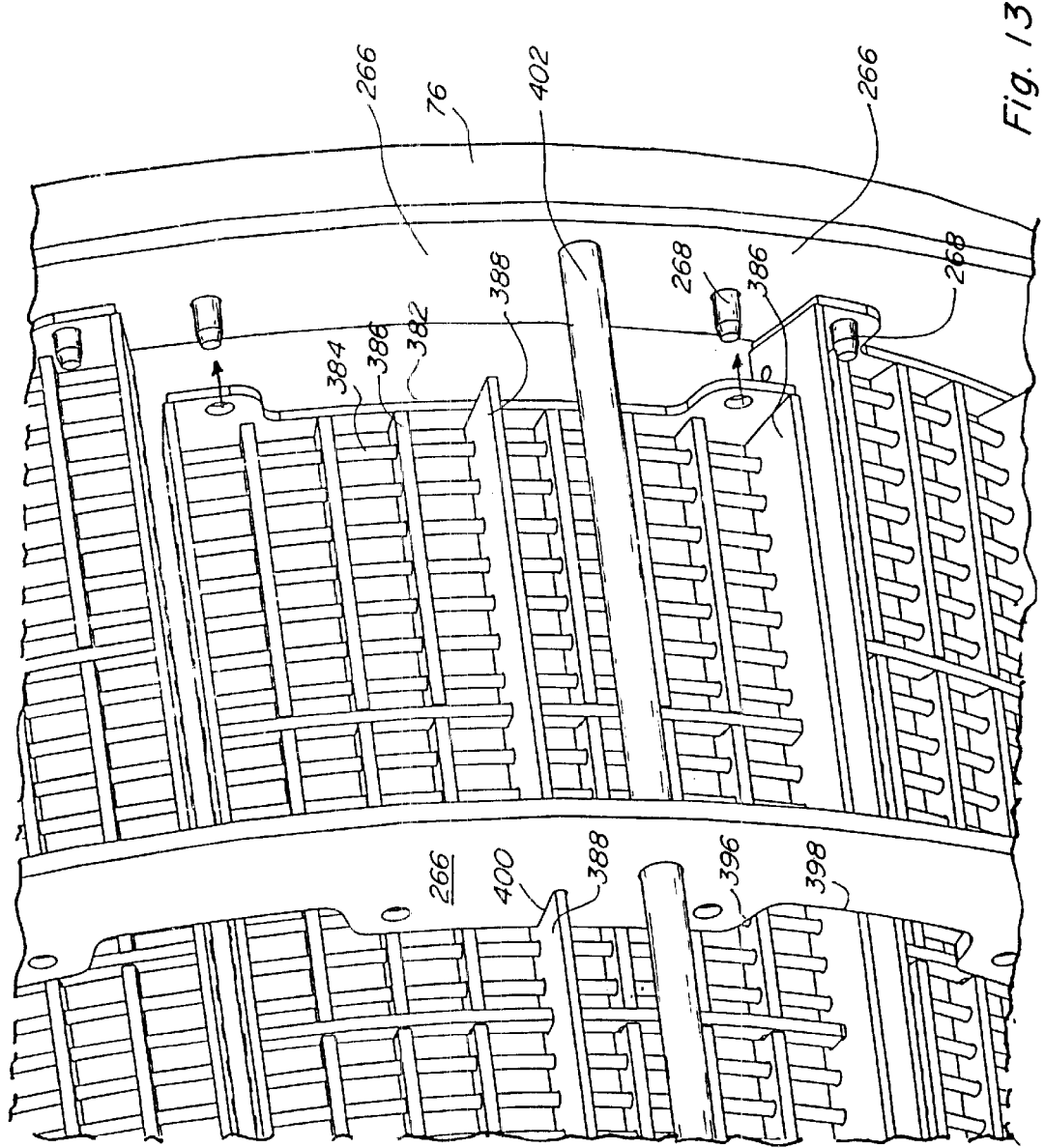
FIG. 13 is an enlarged, partial perspective view of the concave insert shown in FIG. 12 being secured to the frame.

In yet another embodiment, shown in FIGS. 12 and 13, a frame 260 is shown as including five longitudinally spaced and transversely extending rib members 266, with the forwardmost rib member having a plurality of rearwardly extending post members 268 extending through openings formed therein. The post members 268 extend from the support structure disposed in front of the forwardmost rib member. In this embodiment, a plurality of eight concave inserts 380 are elongated in the longitudinal direction, rather than in the transverse direction. Of course, it should be understood that the number of inserts could be more or less than eight. Each concave insert 380 includes a plurality of arcuate, transversely extending side frame members 382 and rods 384, and a plurality of longitudinally extending bar members 386 intersecting and connecting the rods and side frame members. The forwardmost side frame member 382 includes a pair of transversely extending lug portions 398 each having an opening 392 formed therein. The openings 392 are shaped to receive the post members 268 extending from the support structure through the frame member.

In addition, each of the rib members 266 includes a cutout 394 portion shaped to receive the lug portions 390 as the concave inserts are slid longitudinally along the rib members 266 and into engagement with the post members 268. The cutout 394 is defined by opposite sidewalls 396 and a bottom edge 398. The plate members 386 of the concave inserts ride along the bottom edge 398. The frame rib members also include a groove 400 extending downwardly from a top edge thereof between the cutouts 394. An intermediate longitudinally extending plate member 388 of the concave insert extends downwardly from the bottom edge of the side flange 382 and is dimensioned to be received in the groove 400 as the concave insert is slid along the length of the frame and into engagement with the post members 268. The rib member 266 is also provided with a pair of openings formed therethrough adjacent the edges of each cutout. Preferably, the rearmost rib member 266 is secured with fasteners extending though the openings. The frame member 382 of the concave insert can also include post members that are shaped to be received in the openings formed in the side of the next adjacent concave insert arranged in the side-by-side configuration. Alternatively, bolts, pins or like fasteners can interconnect the longitudinally abutting concave inserts. A rod 402 extends longitudinally through the rib members 266 below the concave inserts to stabilize the rib members from longitudinal deflection.

Figure 15:
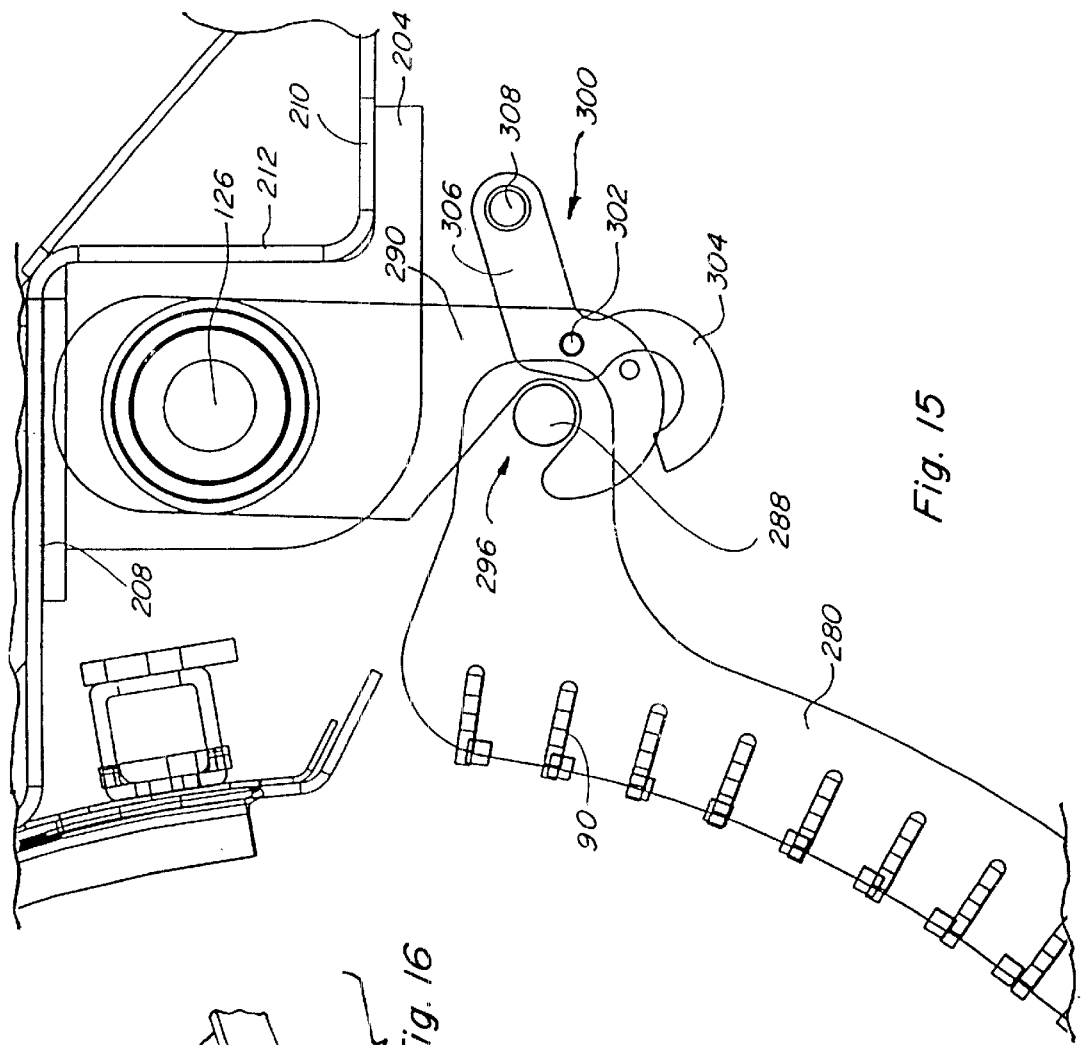
FIG. 15 is an enlarged, partial end view of the locking device shown in FIG. 14 with the locking device in a disengaged position.

Referring to FIGS. 14 and 15, the support structure includes a plurality of hook members 290 extending downwardly therefrom adjacent the ends of the concaves along the right side of the assembly. The hook member 290 is supported by a bracket 294, which is attached to the modified Z-shaped member 202. The hook member 290 can be fixedly mounted to the bracket, or it can be pivotally mounted thereto so as to provide a transverse, lateral movement of the concaves 280, 282. The end of the hook member 290 forms a transversely, inwardly facing opening 296 dimensioned to receive the longitudinally extending pivot member 288 attached to the end of the concave. An adjacent locking device 300 is pivotally mounted to the support structure about axis 302 with a pin or like shaft below the hook member, and includes a hook portion 304 extending transversely inward from the pivot axis 302, and an arm portion 306 extending transversely outward from the pivot axis. The hook portion 304 is pivotable about axis 302 between a disengaged position, shown in FIG. 15, and an engaged position, shown in FIG. 14. In the engaged position, the hook portion 304 substantially closes the opening 296 formed by the hook member 290 so as to prevent the pivot member from being disengaged with the hook member. In the disengaged position, the hook portion is pivoted away from the opening, wherein the pivot member 288 can be disengaged from the hook portion 290 by removing it through the opening 296. The lock device further includes a longitudinally extending lock bar 308 that extends between and connects the ends of the arm portions 306. The lock bar 308 can be grasped by the user and rotated so as to pivot the locking device between the engaged and disengaged positions.

Figure 3:
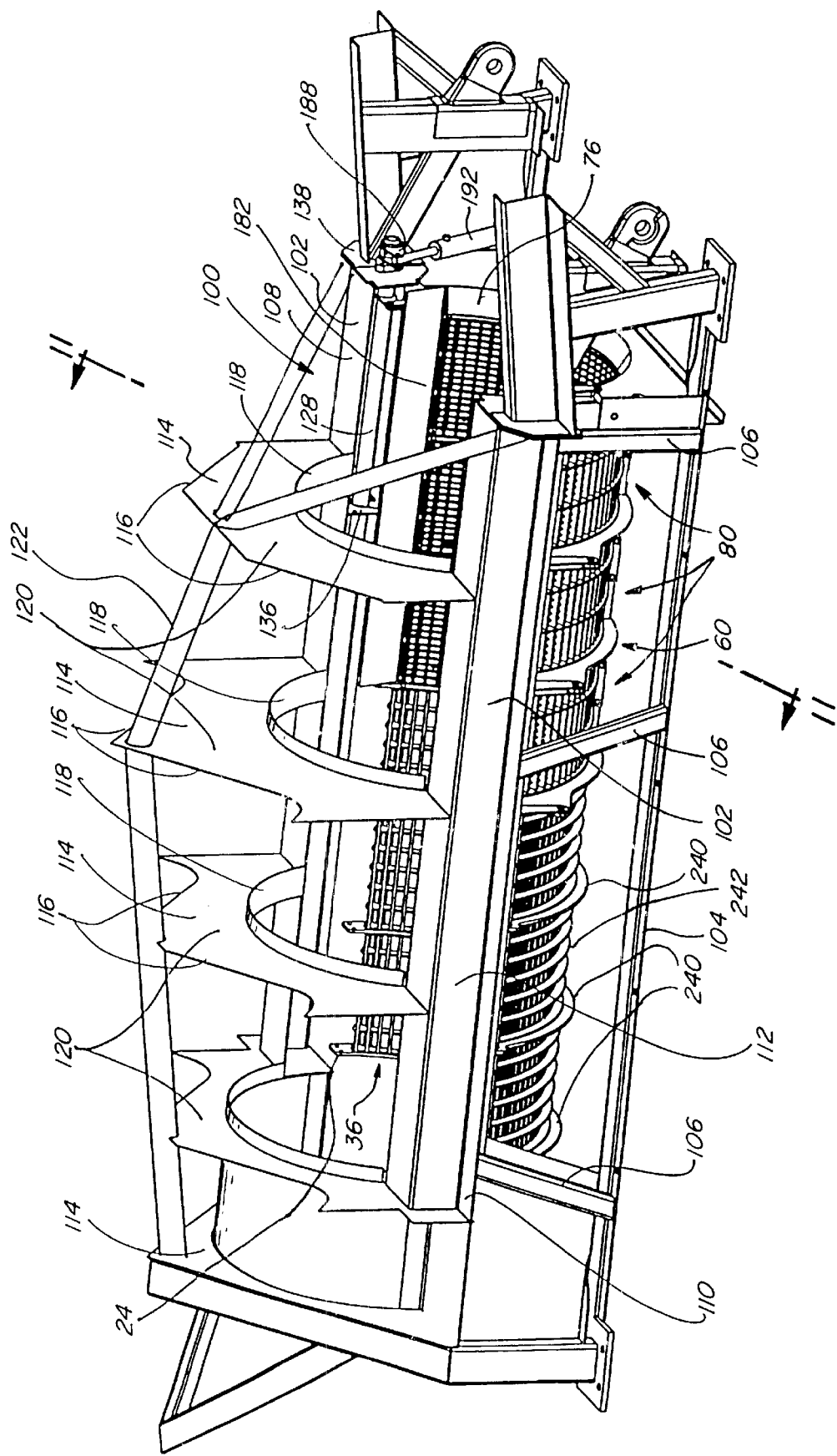
FIG. 3 is a right side perspective view of a concave assembly supported by a support structure.
Figure 4:
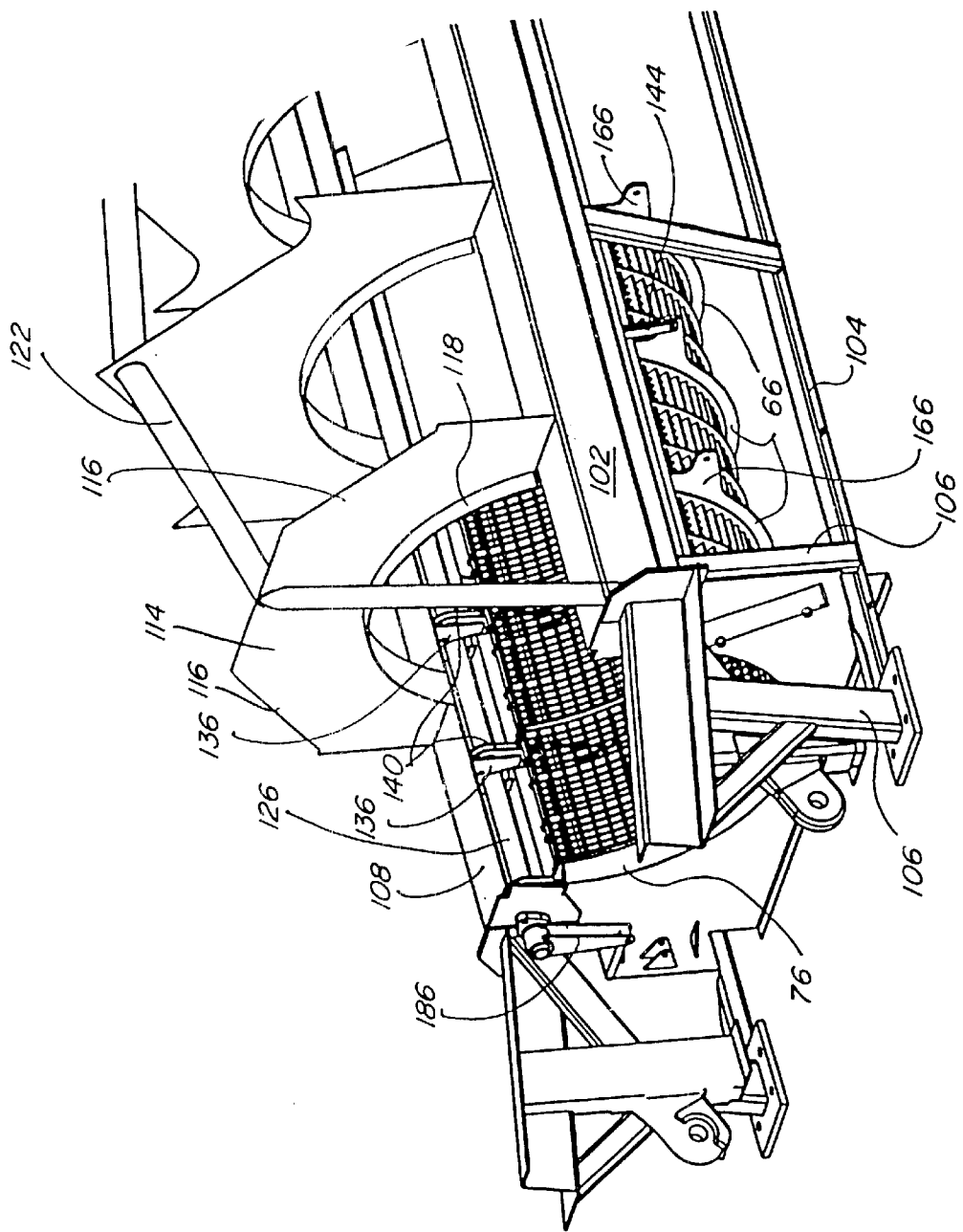
FIG. 4 is a partial left side perspective view of the concave assembly and support structure shown in FIG. 3.
Figure 5:
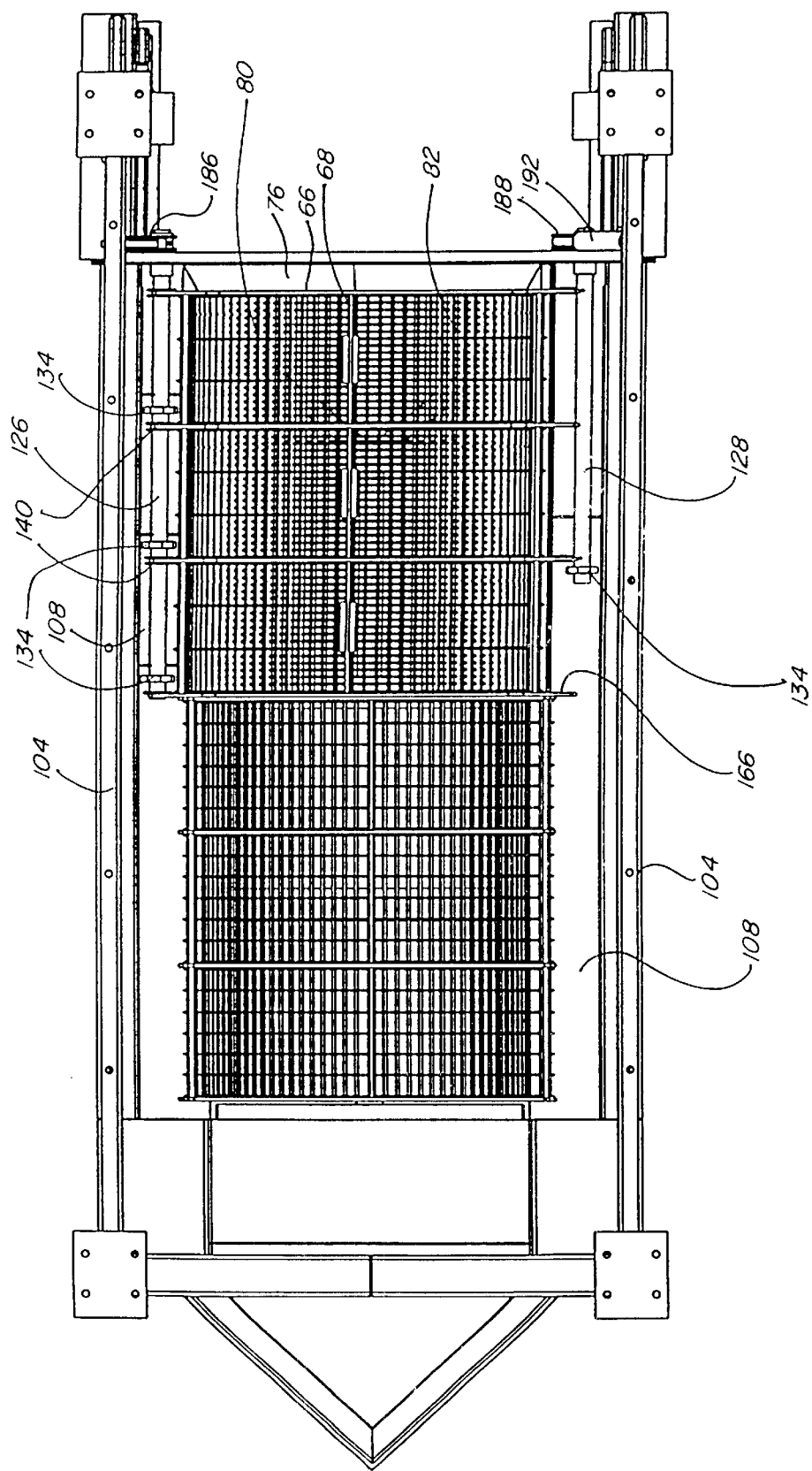
FIG. 5 is a bottom view of the concave assembly and support structure shown in FIG. 3.
Figure 6:
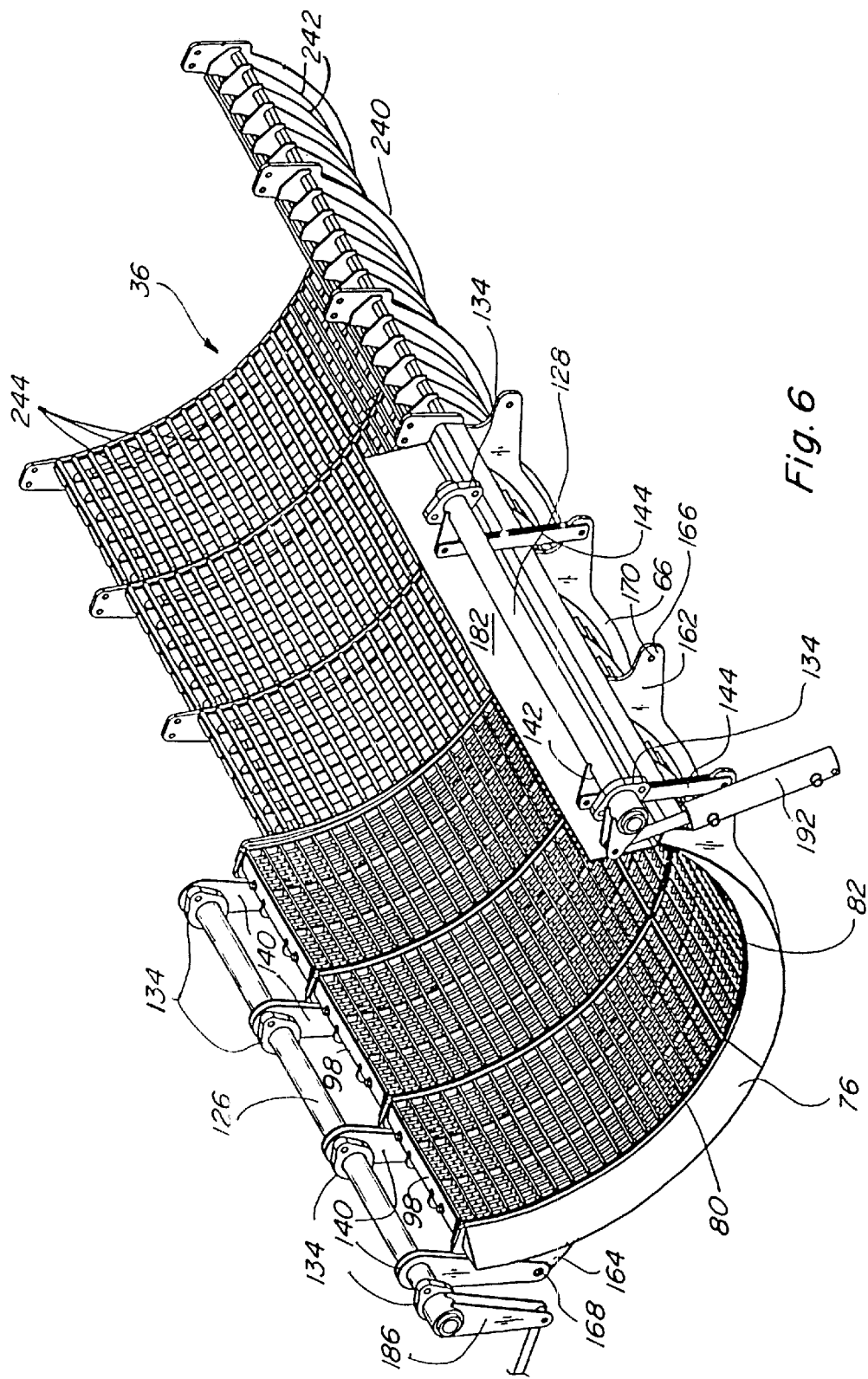
FIG. 6 is an enlarged, partial left side perspective view of the concave assembly and support structure shown in FIG. 3.

Referring to FIGS. 3, 5 and 6, a grate 36 is shown as including four transversely extending primary rib members 240 and a plurality of transversely extending secondary rib members 242 longitudinally spaced between the primary rib members. The grate also includes a plurality of longitudinally extending bar members 244 secured to the top of the rib members by welding or the like. Each of the primary rib members 240 includes an end portion 246 that is mounted to the support structure with bolts. It should be understood, however, that a grate assembly could be constructed which operates similarly to the concave assemblies described herein. Moreover, it should be understood that the terms "concave" and "concave insert," as used herein and in the appended claims, should be defined as including grates and grate inserts respectively.

For example, as best shown in FIGS. 18 and 23–25, the grate assembly could include a frame 860 that supports a plurality of grate inserts 880 and 982, which are removable therefrom in a transverse direction. The frame can be further be configured to be transversely moveable. The grate inserts could be secured to the frame or to each other as described hereinabove. In the preferred embodiment, the frame 860 includes a plurality of rib members 866 extending transversely and circumferentially from one side of the frame to the other. On one side of the frame, a pivot member 878 extends longitudinally through the ends of the rib members 866, while a bracket member 867 interconnects the ends. On the other side, a mounting bracket 882, formed as a C-channel with an outwardly extending flange 884, is connected to the rib members 866. A longitudinally extending frame member 868 connects the rib members and includes a plurality of openings 872. In addition, a longitudinally extending rod is offset from the frame member 868 and further connects the rib members 866.

Referring to FIGS. 24 and 25, the grate inserts 880, 982 include a plurality of transversely extending rib members 242 longitudinally spaced along the insert The grate further includes a plurality of longitudinally extending bar members 244 secured to the top of the rib members by welding or the like. The rib members 242 on the grate insert 880 further include hook portions 890. An end frame member 892 includes a pair of openings 894 The grate insert 982 includes an end frame member 984 and a pair of posts 1006, or pins, extending therefrom, with each end having a tapered, or frusto-conically shaped end portion which facilitates the insertion of the pin into a mating opening. The pins are dimensioned to be received in and inserted through openings 872 in the frame member 868 and the openings 894 formed in the grate insert 880. A frame member 1012 includes an outwardly extending flange 1014, which is preferably angled slightly from the end of the concave insert so as to mate with flange 884 on the frame. Fasteners are installed to releasably connect the grate insert with the frame, as shown in FIG. 18.

The grate inserts are installed in a similar fashion as previously described for the concave inserts. In particular, the grate insert 880 is first inserted through one of the openings 1016 formed between the rib members 866. The hook portions 890 are pivotally supported on the pivot member 878. The grate insert is then pivoted into position where it can be held with fasteners extending through openings 1000 formed in the rib members 866. The grate insert 982 is then inserted through an opposite opening 1016 while the pins 1006 are inserted through openings 872 and 894, so as to secure the grate member 880 in place. The grate insert 982 is then moved into position such that flange 1014 abuts flange 884, whereinafter the flanges can be secured one to the other with fasteners and the like. During this installation, the grate insert 982 can be rested on the rod 867 to alleviate the load being applied by the user as the grate insert is maneuvered into position. A similar rod can be installed on the concave frame described above to provide a support or resting member for one or more of the concave inserts. Conversely, a support member can be installed on one or more sides of the frame member 868, as described above with respect to the concave frame.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

We claim:

1. A rotary combine comprising:

a rotor having a longitudinal axis of rotation;

a concave assembly disposed circumferentially around said rotor and comprising a plurality of concaves outwardly removable away from said rotor in a direction transverse to said longitudinal axis of said rotor; and means for transversely adjusting the position of said concave assembly relative to said rotor comprising a support structure comprising a first and second shaft each defining an axis of rotation substantially parallel to the longitudinal axis of rotation of said rotor and spaced circumferentially around said rotor, a first arm extending radially from said first shaft and pivotally connected to said concave assembly at a first pivot axis, a second arm extending radially from said second shaft, and a link comprising a first and second end, said first end pivotally connected to said second arm and said second end pivotally connected to said concave assembly at a second pivot axis, wherein said first and second pivot axis are substantially parallel to the longitudinal axis of rotation of said rotor and to said axes of rotation of said first and second shaft.

* * * * *